US011335338B2

(12) United States Patent
Lesso et al.

(10) Patent No.: US 11,335,338 B2
(45) Date of Patent: May 17, 2022

(54) SPEECH RECOGNITION

(71) Applicant: Cirrus Logic International Semiconductor Ltd., Edinburgh (GB)

(72) Inventors: John Paul Lesso, Edinburgh (GB); Robert James Hatfield, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/585,167

(22) Filed: Sep. 27, 2019

(65) Prior Publication Data

US 2020/0118557 A1    Apr. 16, 2020

Related U.S. Application Data

(63) Continuation of application No. 15/614,093, filed on Jun. 5, 2017, now Pat. No. 10,431,212, which is a (Continued)

(30) Foreign Application Priority Data

| Jun. 26, 2013 | (GB) | 1311375 |
| Jun. 26, 2013 | (GB) | 1311379 |
| Jun. 26, 2013 | (GB) | 1311381 |

(51) Int. Cl.
*G10L 15/20* (2006.01)
*G10L 15/28* (2013.01)
(Continued)

(52) U.S. Cl.
CPC .............. *G10L 15/20* (2013.01); *G10L 15/28* (2013.01); *G10L 17/24* (2013.01); *G10L 21/0208* (2013.01); *G10L 2015/088* (2013.01)

(58) Field of Classification Search
CPC ... G10L 15/20; G10L 15/28; G10L 2015/088; G10L 17/24; G10L 21/0208
(Continued)

(56) References Cited

U.S. PATENT DOCUMENTS

| 7,535,396 B1 | 5/2009 | Melanson |
| 8,468,019 B2 | 6/2013 | Rempel |

(Continued)

FOREIGN PATENT DOCUMENTS

| CN | 1264887 A | 8/2000 |
| CN | 101320559 A | 12/2008 |

(Continued)

OTHER PUBLICATIONS

Search Report under Section 17(6), Application No. GB1601204.9, dated Aug. 2, 2016, 3 pages.

(Continued)

*Primary Examiner* — Thierry L Pham
(74) *Attorney, Agent, or Firm* — Jackson Walker L.L.P.

(57) ABSTRACT

A speech recognition system comprises: an input, for receiving an input signal from at least one microphone; a first buffer, for storing the input signal; a noise reduction block, for receiving the input signal and generating a noise reduced input signal; a speech recognition engine, for receiving either the input signal output from the first buffer or the noise reduced input signal from the noise reduction block; and a selection circuit for directing either the input signal output from the first buffer or the noise reduced input signal from the noise reduction block to the speech recognition engine.

15 Claims, 20 Drawing Sheets

Related U.S. Application Data continuation of application No. 14/314,182, filed on Jun. 25, 2014, now Pat. No. 9,697,831.

(51) Int. Cl.
*G10L 15/08* (2006.01)
*G10L 17/24* (2013.01)
*G10L 21/0208* (2013.01)

(58) Field of Classification Search
USPC .......................................................... 704/233
See application file for complete search history.

(56) References Cited

U.S. PATENT DOCUMENTS

| | | |
|---|---|---|
| 9,818,407 B1 * | 11/2017 | Seeker-Walker ....... G10L 15/32 |
| 2007/0274552 A1 | 11/2007 | Konchitsky et al. |
| 2008/0317259 A1 | 12/2008 | Zhang et al. |
| 2011/0276323 A1 | 11/2011 | Seyfetdinov |
| 2011/0317848 A1 | 12/2011 | Ivanov et al. |
| 2012/0008723 A1 | 1/2012 | Stojanovic |
| 2013/0060567 A1 | 3/2013 | Konchitsky |
| 2013/0080171 A1 | 3/2013 | Mozer et al. |
| 2013/0132091 A1 | 5/2013 | Skerpac |
| 2013/0166296 A1 | 6/2013 | Scheffer |
| 2014/0136210 A1 | 5/2014 | Johnston |
| 2014/0187211 A1 | 7/2014 | Zhang |
| 2014/0278366 A1 | 9/2014 | Jacob et al. |
| 2014/0278389 A1 | 9/2014 | Zurek et al. |
| 2014/0278443 A1 * | 9/2014 | Gunn ................... G06F 3/0488 704/275 |
| 2014/0365214 A1 | 12/2014 | Bayley |
| 2015/0162002 A1 * | 6/2015 | Liu ......................... G10L 15/26 704/235 |
| 2015/0302855 A1 * | 10/2015 | Kim ....................... G10L 17/22 704/275 |

FOREIGN PATENT DOCUMENTS

| | | |
|---|---|---|
| CN | 102708855 A | 10/2013 |
| EP | 0387791 A2 | 9/1990 |
| EP | 0736995 A2 | 10/1996 |
| EP | 1286328 A2 | 2/2003 |
| EP | 2293289 A1 | 3/2011 |
| WO | 03/017719 A1 | 2/2003 |

OTHER PUBLICATIONS

Combined Search and Examination Report under Sections 17 and 18(3), Application No. GB1614496.6, dated Oct. 3, 2016, 5 pages.
Combined Search and Examination Report, Application No. GB1601204.9, dated Feb. 29, 2016, 5 pages.
First Office Action, China National Intellectual Property Administration, CN Application No. 201402942604, dated Oct. 23, 2018.
Combined Search and Examination Report under Sections 17 and 18(3), Application No. GB1714463.5, dated Nov. 2, 2017.
Combined Search and Examination Report under Sections 17 and 18(3), Application No. GB1714464.3, dated Nov. 30, 2017.

* cited by examiner

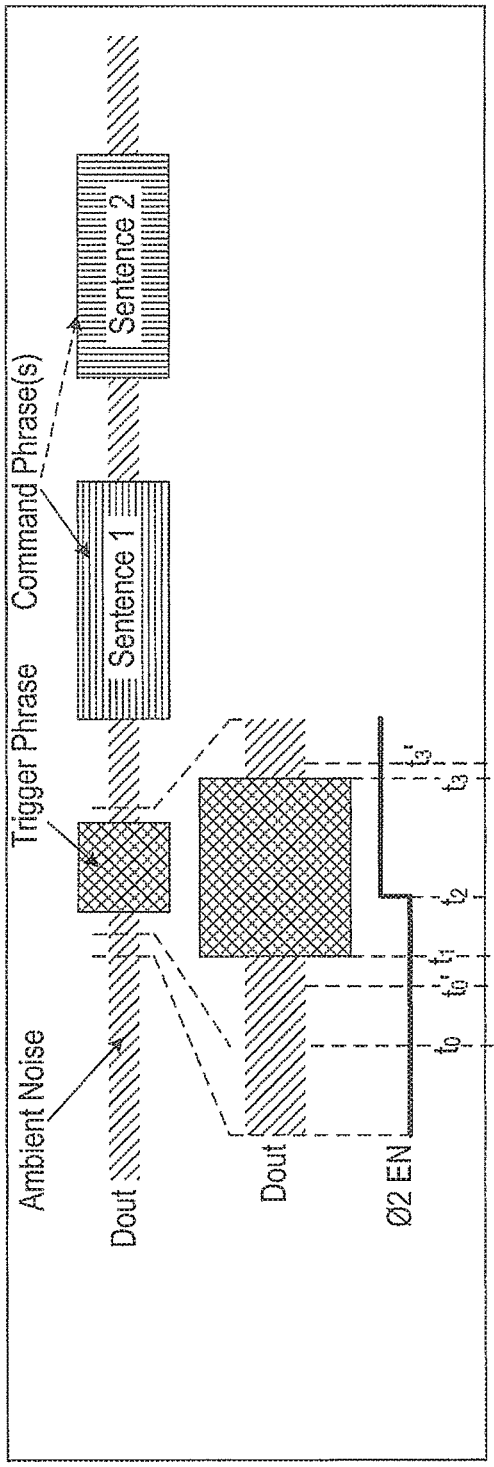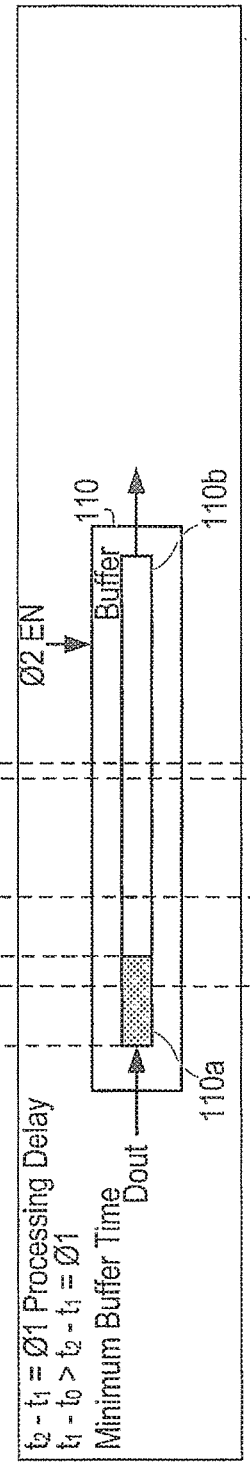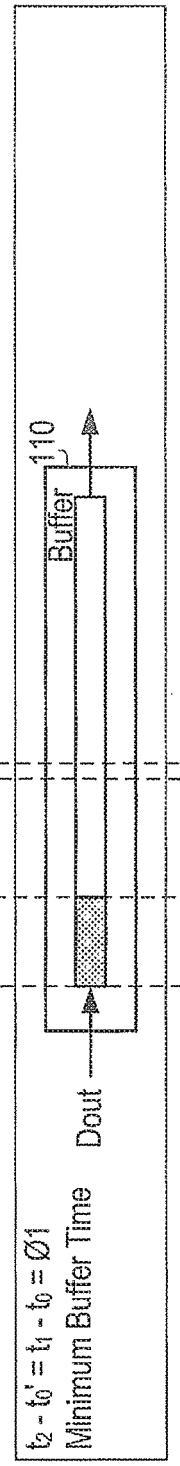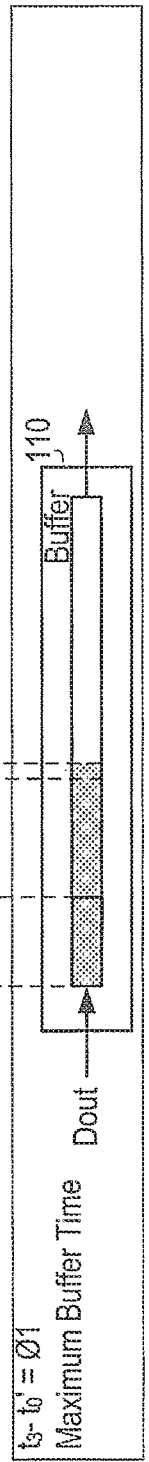
Figure 5b
Figure 5c
Figure 5d
Figure 5e

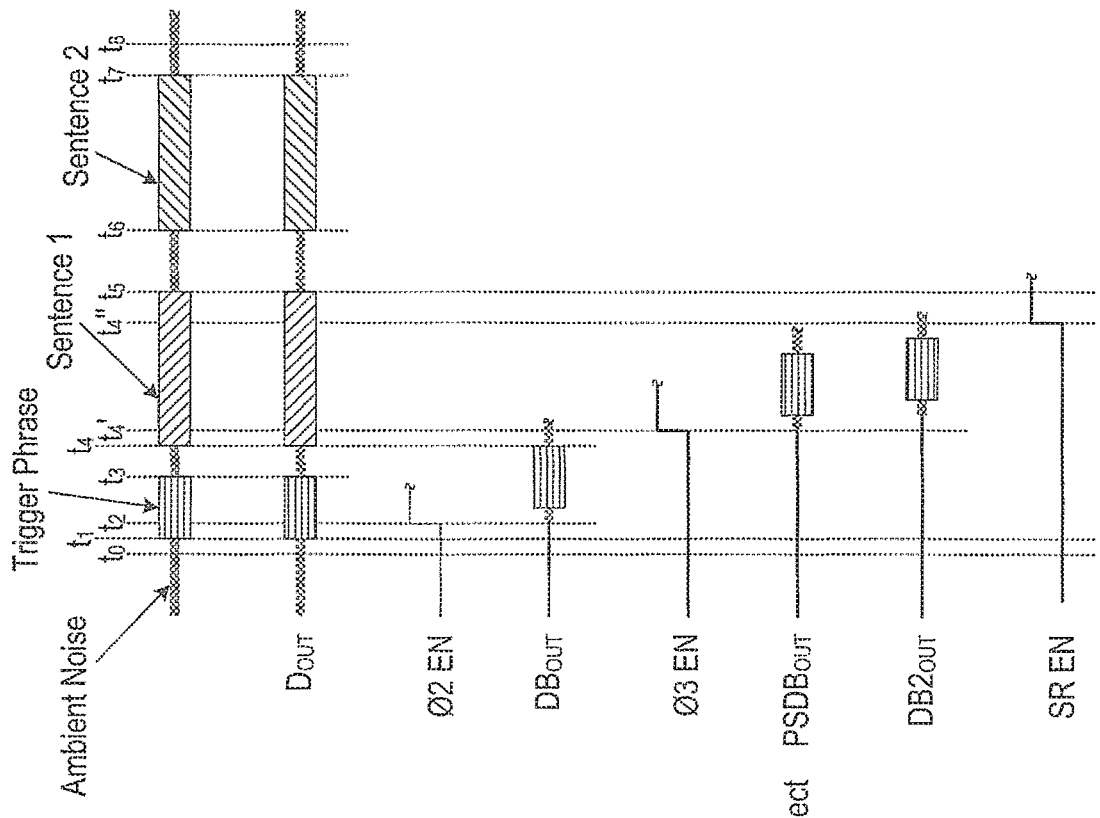

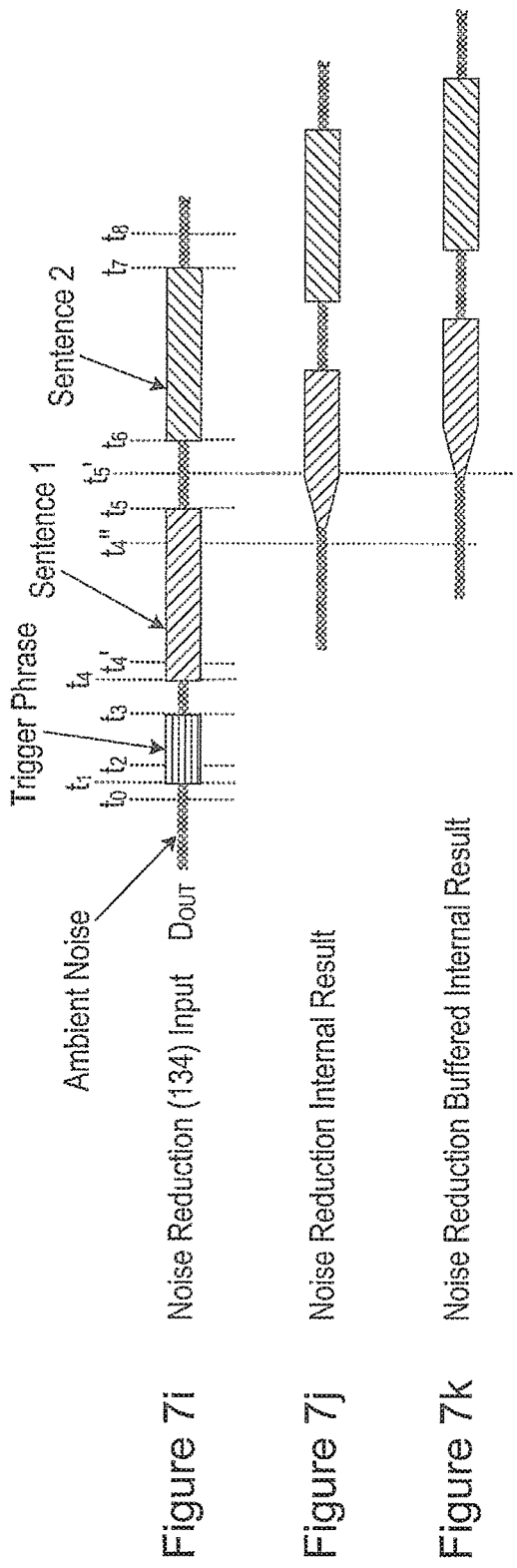

SPEECH RECOGNITION

The present disclosure is a continuation of U.S. Non-Provisional patent application Ser. No. 15/614,093, filed Jun. 5, 2017, claims priority to U.S. Non-Provisional patent application Ser. No. 14/314,182, filed Jun. 25, 2014, which claims priority to United Kingdom Patent Application Serial No. 1311381.6, filed Jun. 26, 2013, United Kingdom Patent Application Serial No. 1311375.8, filed Jun. 26, 2013, and United Kingdom Patent Application Serial No. 1311379.0, filed Jun. 26, 2013, each of which is incorporated by reference herein in its entirety.

This invention relates to speech recognition, and in particular to a system that can detect that a pass phrase has been spoken, and may also be able to validate that the pass phrase was spoken by a specified speaker, allowing the system to be used as a hands-free and low power consumption means of activating higher power consumption functions such as speech recognition in consumer devices, with smartphones being just one example of such consumer devices. Aspects of the invention also relate to an analog-to-digital converter suitable for use in such a system or device.

It is known to provide circuitry which is able to continually listen for voice commands, while in stand-by mode. This removes the requirement for a button or other mechanical trigger to generally 'wake up' the device from stand-by mode, for instance to activate a speech recognition function.

One possible way of initiating hands-free operation is for the user of the phone to say a key phrase, for example "Hello phone". The device is then able to recognise that the key phrase has been spoken and wake up the speech recognition function and potentially the rest of the device. Furthermore the hands-free command may be programmed to be user specific, in that case only a previously registered user (or users) can utter the key phrase and the device will be able to verify that it is that specific user speaking (speaker recognition) and progress to wake up the speech recognition function.

However, such circuitry implements relatively complex algorithms and thus has relatively high power consumption, meaning that it is somewhat impractical to keep such circuitry continually active in a portable device with limited battery capacity or other power availability constraints.

In order to perform digital processing of sounds, it is usually necessary to detect the sounds with a microphone, which generates an analog signal, and to perform analog-to-digital conversion to generate a digital signal in a form that is suitable for such processing.

To provide sufficient accuracy in the digitisation of the speech signal for reliable speech recognition or user recognition, a high performance analog-to-digital converter (ADC) is required. Typically this will include some single-bit or multi-bit quantiser embedded in a feedback loop to spectrally shape the quantisation noise, for example as a delta-sigma ADC.

The quantiser may take several forms, including a voltage-to-frequency converter (or voltage-controlled-oscillator (VCO)) followed by a counter. The VCO generates a pulse train at a frequency that depends on the present value of its input analog voltage signal. The counter may count the number of pulses generated by the voltage controlled oscillator in a given time interval. The digital count value accumulated during each interval thus depends on the frequency at which the pulses are generated, and is thus a measure of the present value of the analog signal presented to the quantiser.

The ADC feedback loop will typically also comprise a digital-to-analog converter (DAC) to provide an analog feedback signal from the quantiser digital output and an analog op amp integrator to accept this feedback signal and the input signal. These analog components must have low thermal noise and adequate speed, and as a result they will consume relatively high power. Again, it is somewhat impractical to keep such ADC circuitry continually active in a portable device with limited battery capacity or other power availability constraints.

According to the present invention, there is provided a speech recognition system, comprising:
an input, for receiving an input signal from at least one microphone;
a first buffer, for storing the input signal;
a noise reduction block, for receiving the input signal and generating a noise-reduced input signal;
a speech recognition engine, for receiving either the input signal output from the first buffer or the noise-reduced input signal from the noise reduction block; and
a selection circuit for directing either the input signal output from the first buffer or the noise-reduced input signal from the noise reduction block to the speech recognition engine.

For a better understanding of the present invention, and to show how it may be put into effect, reference will now be made, by way of example, to the accompanying drawings, in which:—

FIGS. 5b-5e illustrate the operation of the system of FIG. 5a;

FIGS. 7a-7k illustrate a time history of signals in the system of FIG. 5;

Figure 9:
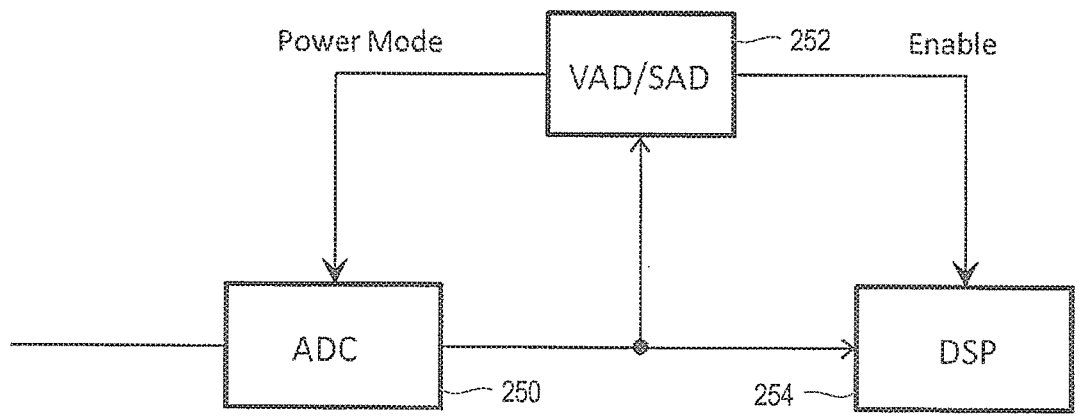
Figure 10:
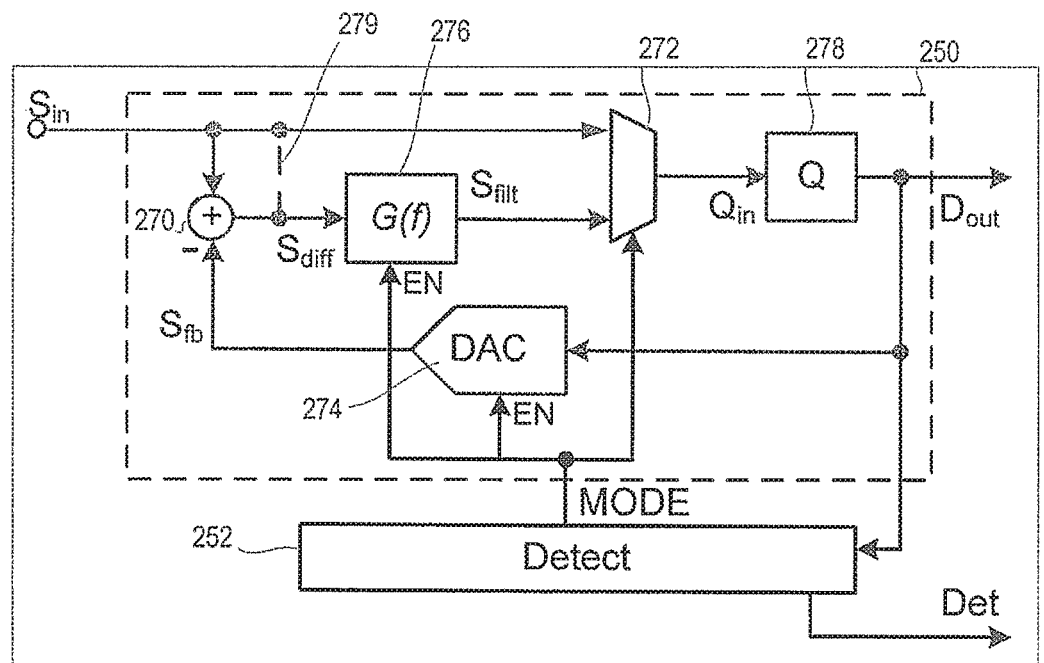
Figure 11:
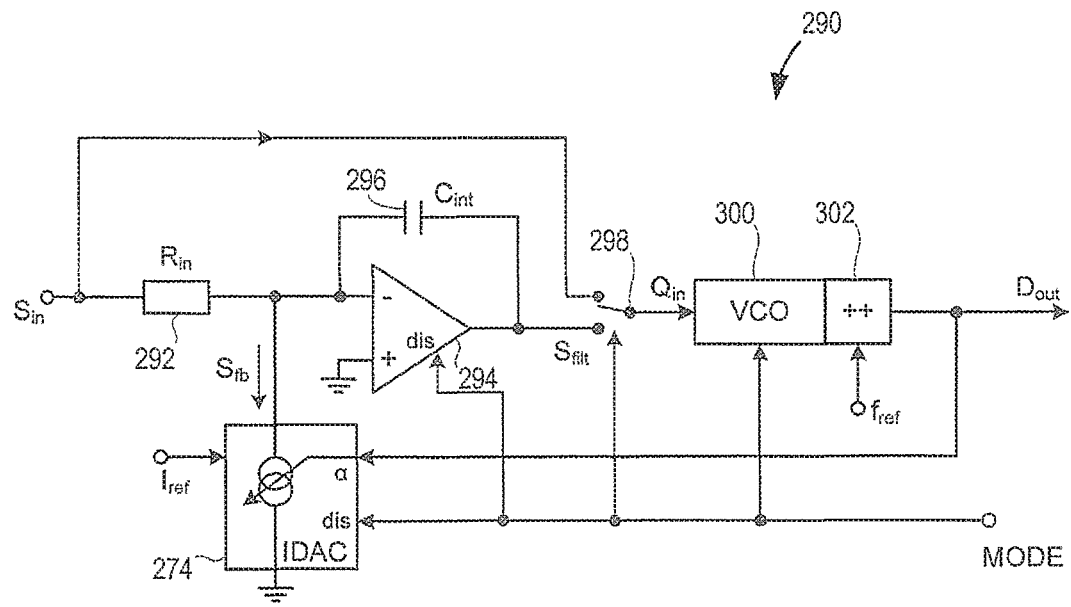
Figure 12:
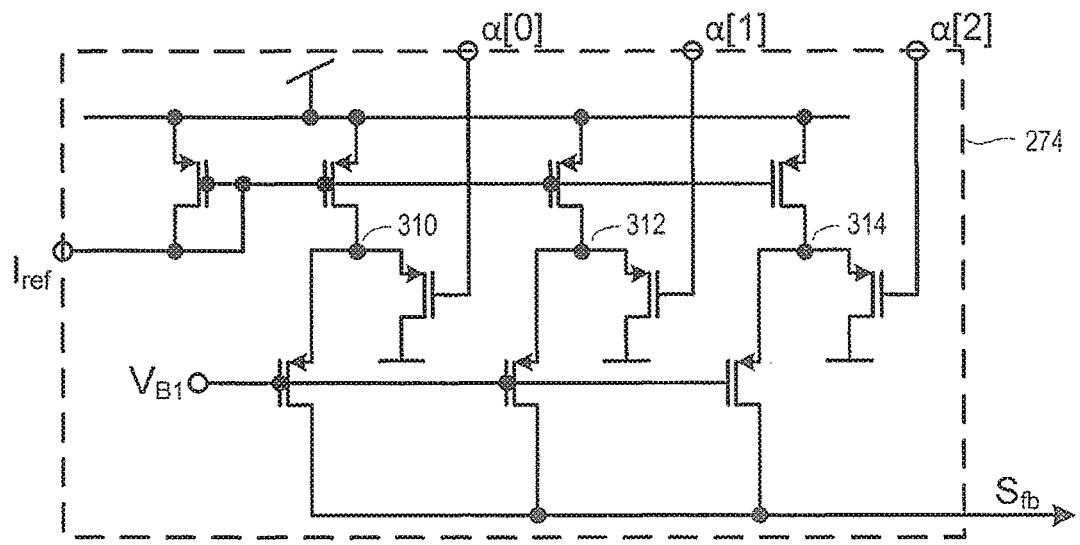
Figure 13:
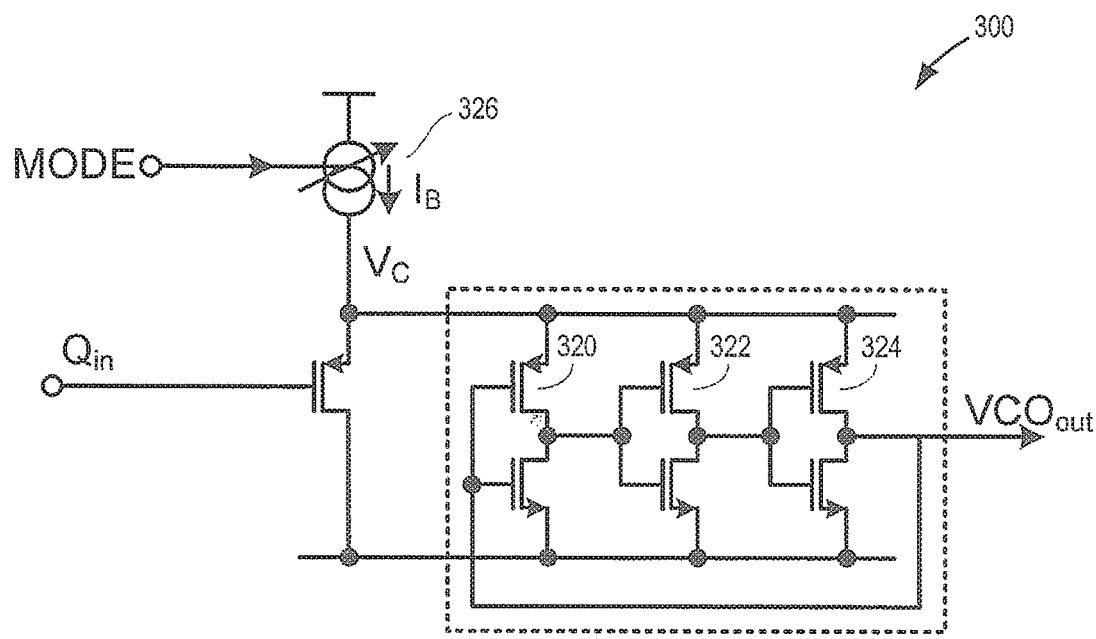
Figure 14:
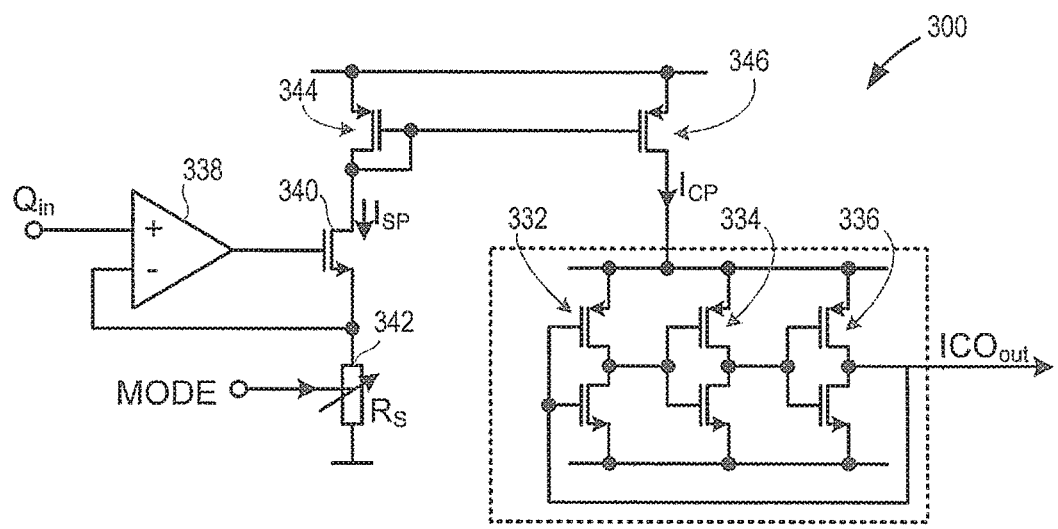
Figure 15:
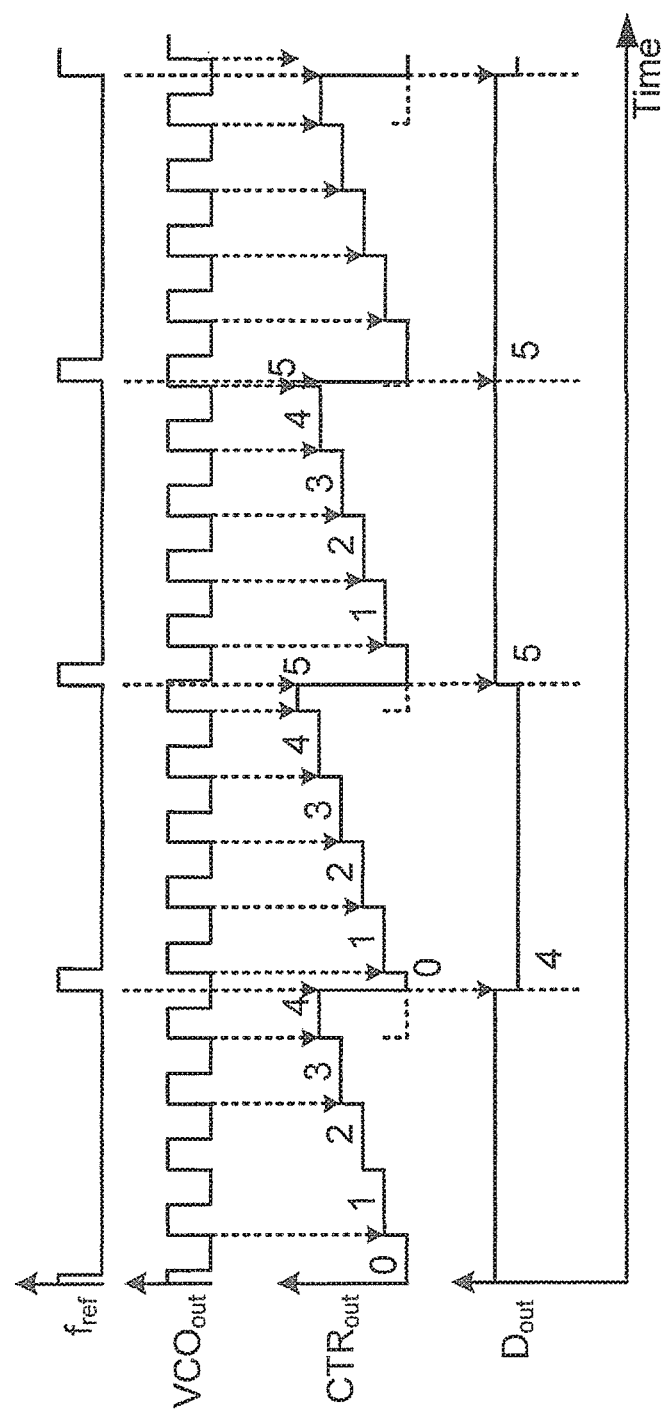
Figure 16:
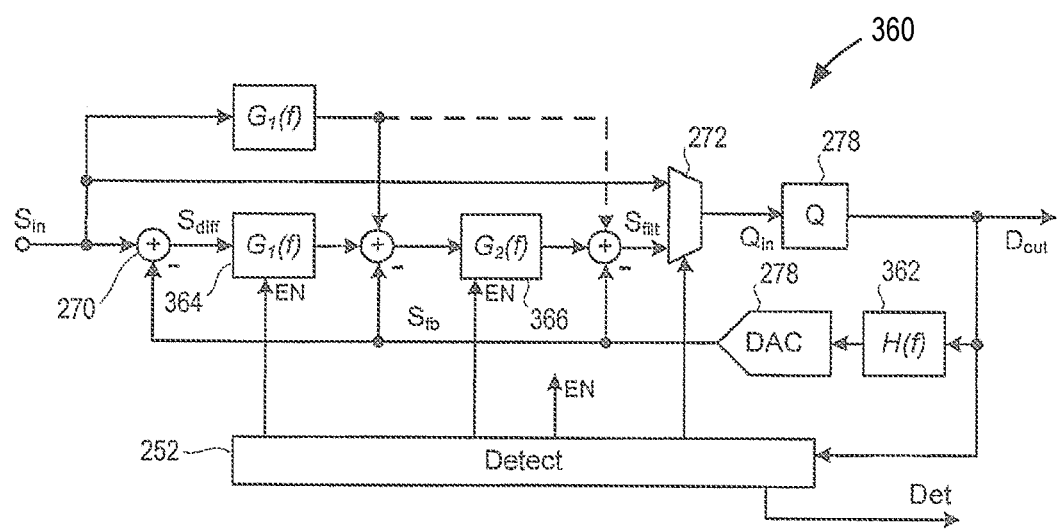
Figure 17:
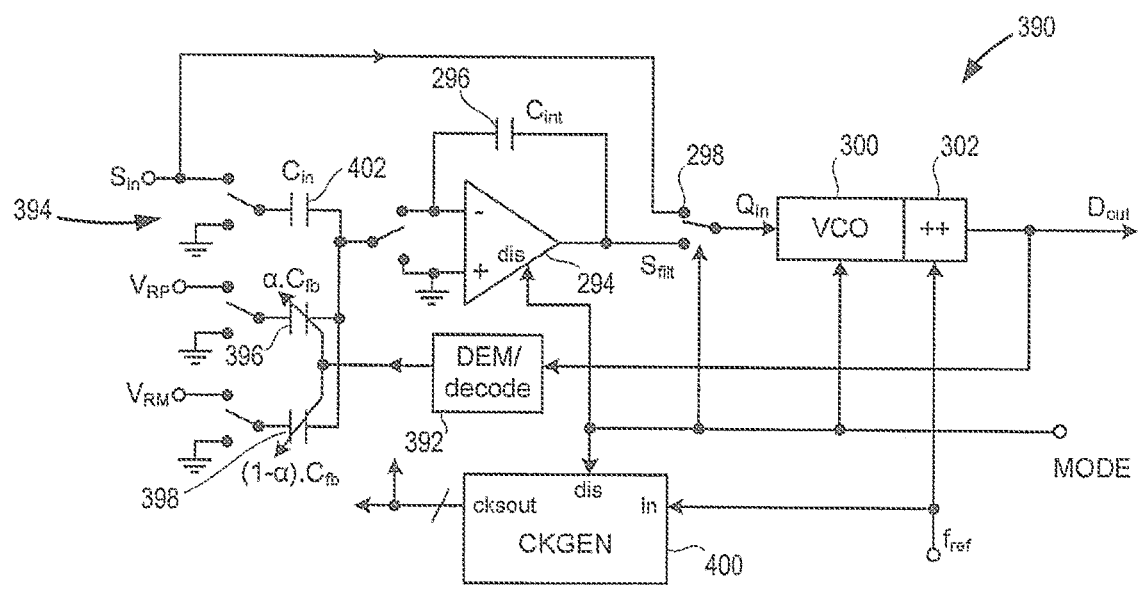
Figure 18:
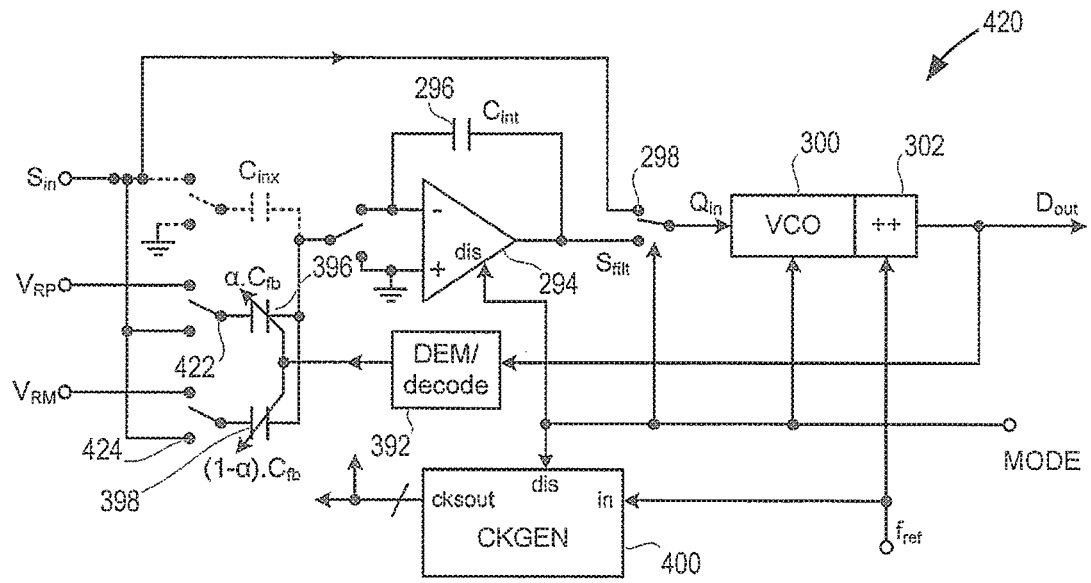
Figure 19:
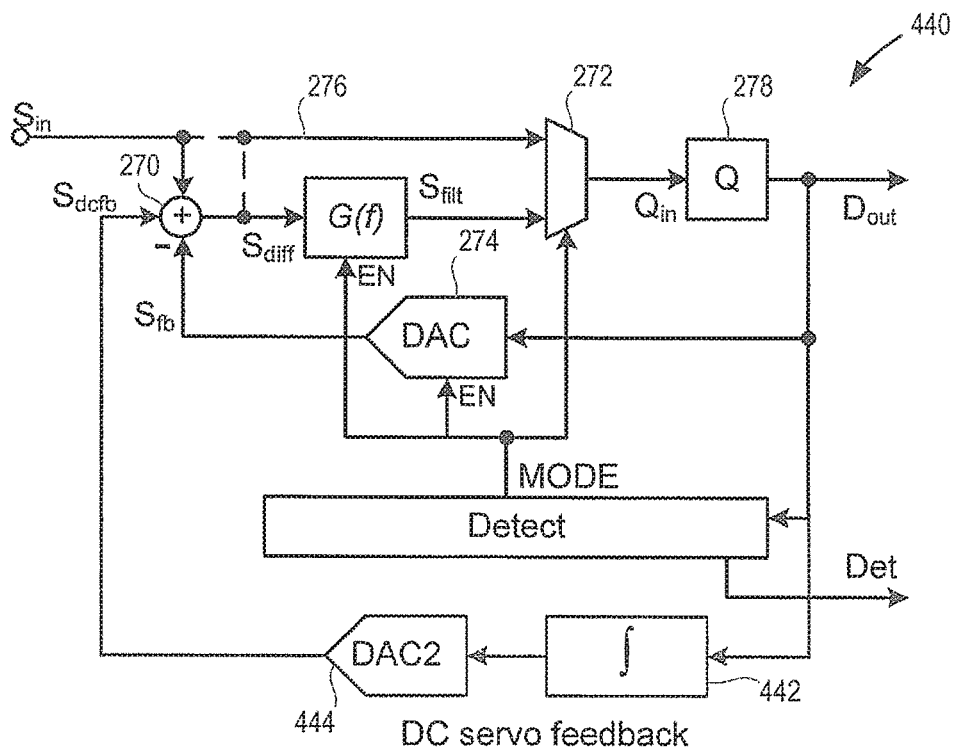
Figure 20:
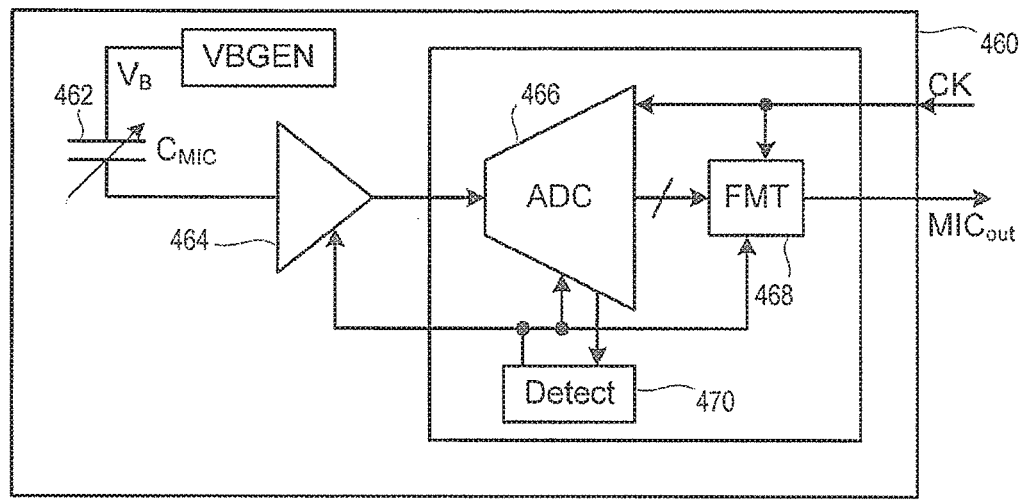

FIGS. 8(a)-8(d) illustrate a schematic diagram of an analog-to-digital converter depicting time histories illustrating the operation of a speech recognition system;

FIG. 9 is a schematic diagram illustrating parts of the system of FIG. 5;

FIG. 10 is a diagram illustrating in general terms the form of an analog-to-digital converter;

FIG. 11 is a circuit diagram illustrating an analog-to-digital converter of the same general form as the analog-to-digital converter shown in FIG. 10;

FIG. 12 is a circuit diagram that shows in more detail the form of a component in the circuit of FIG. 11;

FIG. 13 is a circuit diagram that shows in more detail the form of another component in the circuit of FIG. 11;

FIG. 14 is a circuit diagram that shows in more detail an alternative form of the component in the circuit of FIG. 11;

FIG. 15 is a time history, illustrating the operation of the analog-to-digital converter of FIG. 11;

FIG. 16 is a circuit diagram illustrating an analog-to-digital converter of the same general form as the analog-to-digital converter shown in FIG. 10;

FIG. 17 is a circuit diagram illustrating an analog-to-digital converter of the same general form as the analog-to-digital converter shown in FIG. 10;

FIG. 18 is a circuit diagram illustrating an analog-to-digital converter of the same general form as the analog-to-digital converter shown in FIG. 17;

FIG. 19 is a circuit diagram illustrating an analog-to-digital converter of the same general form as the analog-to-digital converter shown in FIG. 10;

FIG. 20 is a schematic diagram of a microphone package; and

Figure 21:
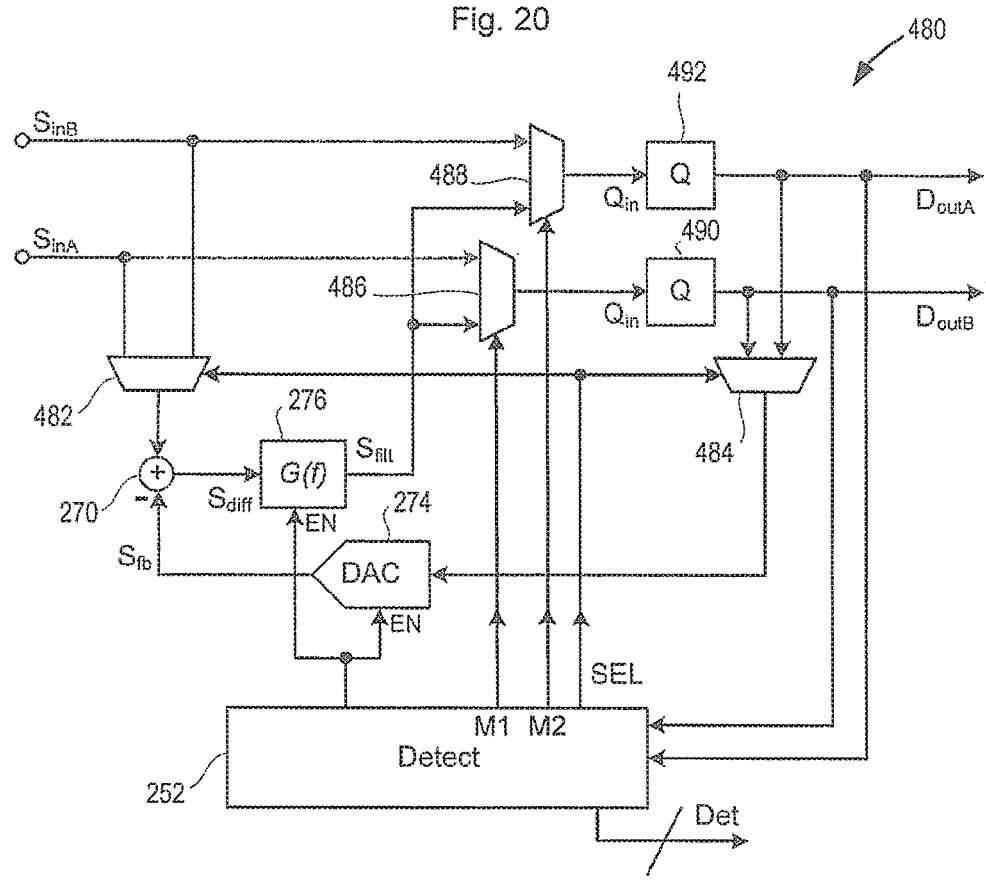

FIG. 21 is a circuit diagram illustrating a use of an analog-to-digital converter.

Figure 1:
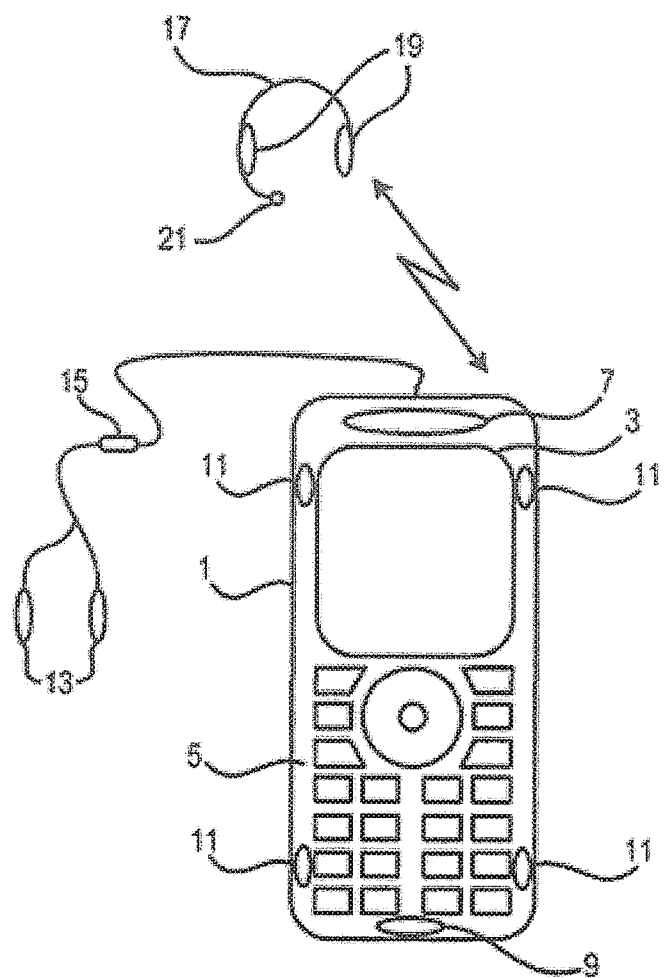
FIG. 1 shows a mobile telephone and various peripheral devices.

FIG. 1 shows a consumer device according to an aspect of the invention, in this example a communications device in the form of a mobile telephone 1, more specifically in the form of a smartphone, which can be at least partially controlled using voice recognition. In this example, the mobile telephone 1 has a screen 3 and a keypad 5, although of course the invention is equally applicable to devices with touchscreens and/or other user interfaces and devices such as tablet computers for example or devices with more limited communications capability such as (pure) Bluetooth™—enabled devices or devices with no communication capability. The mobile telephone 1 also has an inbuilt speaker 7 and an inbuilt main microphone 9, which are both analog transducers. The mobile telephone 1 also has a plurality of, in this particular example four, microphones 11 (which may be analog or digital microphones), allowing multiple acoustic signals to be received and converted to respective electrical signals, for example to provide multiple electrical ambient noise signals for use in a noise cancellation system or for example to provide multiple signals to allow beamforming capabilities to enhance the signal input to a speech recognition system.

As shown in FIG. 1, the mobile telephone 1 may have a jack socket (not illustrated) or similar connection means, such as a USB socket or a multi-pin connector socket, allowing a headset, comprising a pair of stereo earpieces 13 and possibly a microphone 15, to be connected to it by respective wires and a jack plug (not illustrated) or similar connection means, such as a USB plug or a multi-pin connector plug. Alternatively, the mobile telephone 1 may be connected wirelessly, for example using the Bluetooth™ communications protocol, to a wireless headset 17, having earpieces 19 and possibly a microphone 21. Although not illustrated, the earpieces 13, 19 may also comprise one or more ambient noise microphones (which may be analog or digital microphones), allowing one or more ambient noise signals to be received, for example for use in a noise cancellation system.

Figure 2:
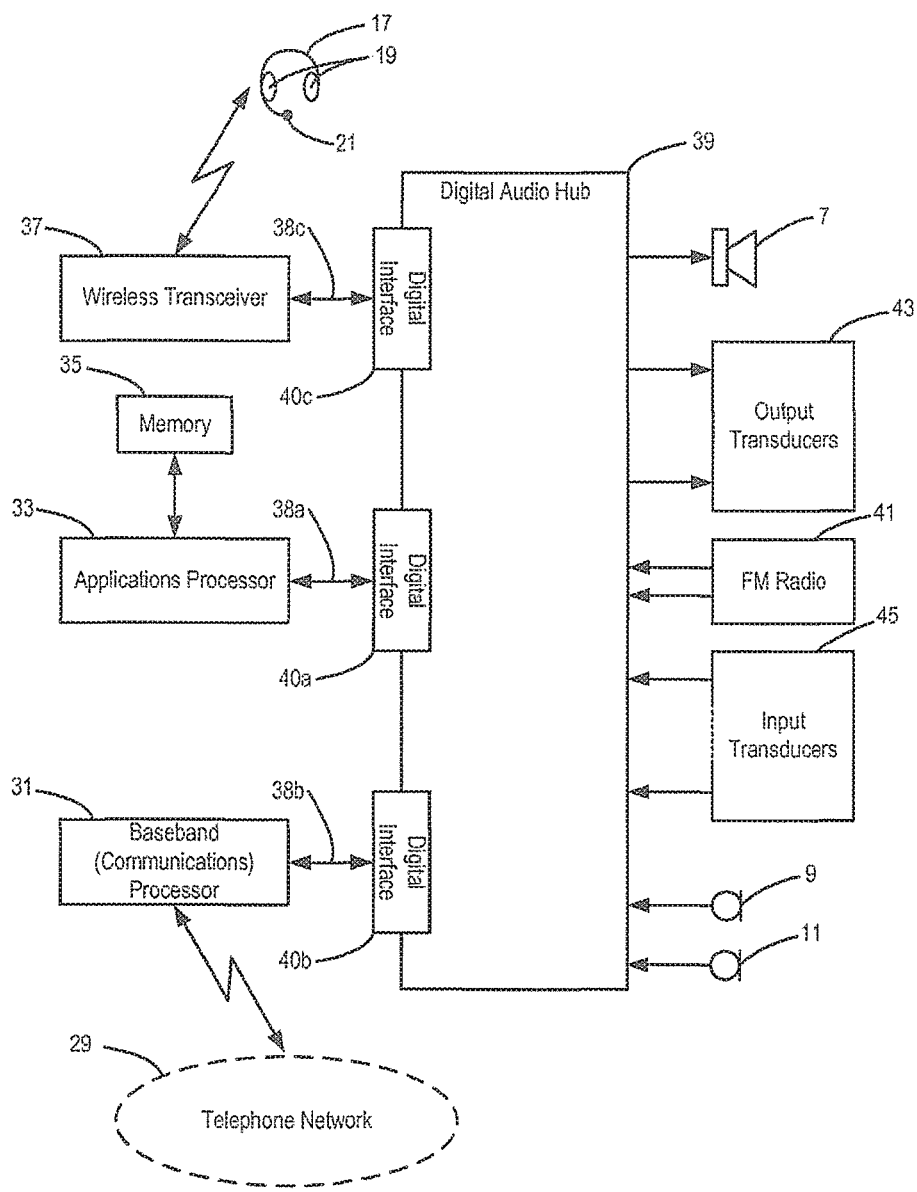
FIG. 2 shows components of the audio processing circuitry in the mobile telephone of FIG. 1.

FIG. 2 shows components of the audio handling system in the mobile telephone 1. Communication with the cellular telephone network 29 is handled by a baseband processor (sometimes referred to as a communications processor) 31. An applications processor 33 handles, amongst other processes, processes in which audio data is reproduced from or stored into a memory 35 (which may be solid-state or on a disk, and which may be built-in or attachable, for example, either permanently in the mobile telephone or on a removable memory device) and other processes in which audio data is generated internally within the telephone 1. For example, the applications processor 33 may handle: voice recognition; the reproduction of stereo music stored digitally in the memory 35; recording of telephone conversations and other audio data into the memory 35; the generation of satellite navigation commands; and the generation of tones to confirm the pressing of any button on the keypad 5. A wireless transceiver (or wireless codec) 37 handles communications using the Bluetooth™ protocol or another short-range communications protocol, for example with the wireless headset 17.

The baseband processor 31, the applications processor 33, and the wireless transceiver 37 all send audio data to, and receive audio data from, switching circuitry in the form of an audio hub 39, i.e. an audio codec. The audio hub 39 takes the form of an integrated circuit in this described embodiment.

In the embodiment described above, the audio signals between the audio hub 39 and the baseband processor 31, the applications processor 33, and the wireless transceiver 37 are all digital, and some of them may be in stereo, comprising a left audio data stream and a right audio data stream. Additionally, at least in the case of communication with the applications processor 33, further data streams may be multiplexed into the audio signals, for example to enable the applications processor 33 to provide stereo music and also other audio signals such as key press confirmation tones simultaneously.

The audio hub 39 communicates with the baseband processor 31, the applications processor 33, and the wireless transceiver 37 over respective audio data links, i.e. buses, 38b, 38a, 38c, and the audio hub 39 has respective digital interfaces 40b, 40a, 40c for these data links.

It will be appreciated that, in applications where there is no requirement for a wireless transceiver 37 for example, the audio hub 39 need only have two audio data links and two respective digital interfaces.

The audio hub 39 also provides audio signals to, and receives audio signals from, the built-in analog audio transducers of the mobile telephone 1. As shown in FIG. 2, the audio hub 39 provides output audio signals to the speaker 7, and receives input audio signals from the microphones 9, 11.

The audio hub 39 can also be connected to other output transducers 43, which may be analog or digital transducers, and which may be built in to the mobile telephone 1 (for example in the case of a haptic output transducer) or in devices external to the mobile telephone 1 (for example the earpieces 13 of the wired headset shown in FIG. 1). The audio hub 39 can also be connected to other input transducers 45, which again may be analog or digital transducers, and which again may be built in to the mobile telephone 1 (for example an ultrasound microphone) or in devices external to the mobile telephone 1 (for example the microphone 15 of the wired headset).

It is to be appreciated that FIG. 2 shows just one possible device that can be controlled by voice recognition, and that generally similar architectures, for example based around audio hub integrated circuits as described here, are usable in an extremely wide range of electronic devices, including industrial, professional or consumer devices, such as cameras (DSC and/or video), portable media players, PDAs, games consoles, satellite navigation devices, tablets, notebook computers, TVs or the like. Devices comprising other embodiments or aspects of the invention may have different architectures, for example with only a single data interface, or even with no audio data interfaces to other processors.

Figure 3:
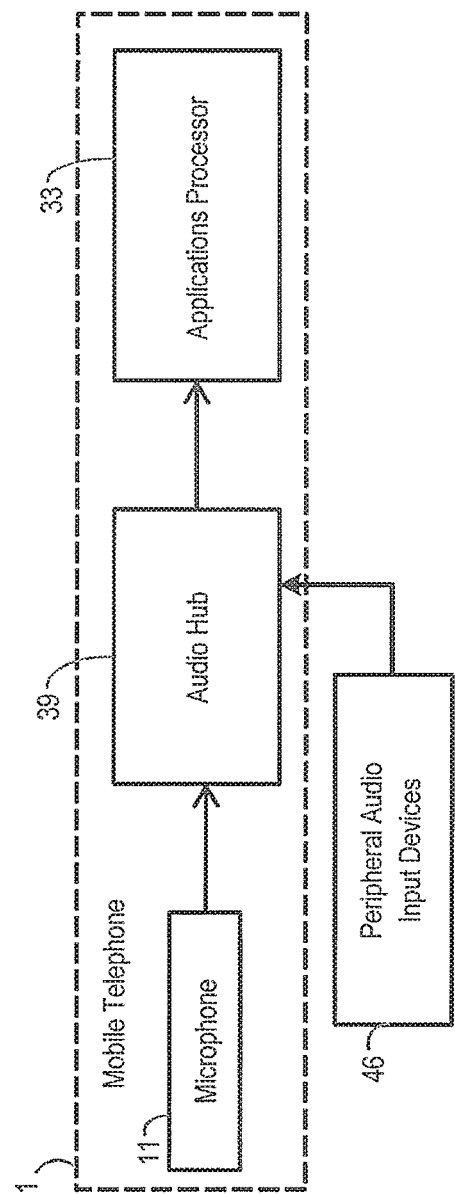
FIG. 3 shows a simplified schematic of FIG. 2 of the components which relate to the voice recognition of the device.

FIG. 3 is a block diagram showing components of the audio system which may be involved in the voice recognition functionality. The microphone, or multiple microphones, 11, audio hub 39, and applications processor 33 are located in the mobile telephone 1, whereas the peripheral audio input devices 46 are connected to the mobile telephone 1 by either a wired or wireless connection.

The electrical signals which are continuously generated in response to respective acoustic stimuli by either one microphone or multiple microphones 11 or the peripheral audio input devices 46 are inputted into the audio hub 39. These generated audio signal or signals are then routed through the audio hub 39, wherein the audio signals can be processed by one or more digital signal processing (DSP) elements. Inside the audio hub 39 the audio signals are not restricted to one route and can be processed in many different ways. As described in more detail below, this processing can include key phrase detection, noise reduction, altering the frequency response, and altering the gain of the signal. Audio signal analysis and processing can take place in the audio hub 39 when other components, such as the applications processor 33 of the audio system, are in stand-by mode, i.e. in a low-power mode.

In this described example, the voice recognition functionality operates using a multi-phase process.

Figure 4:
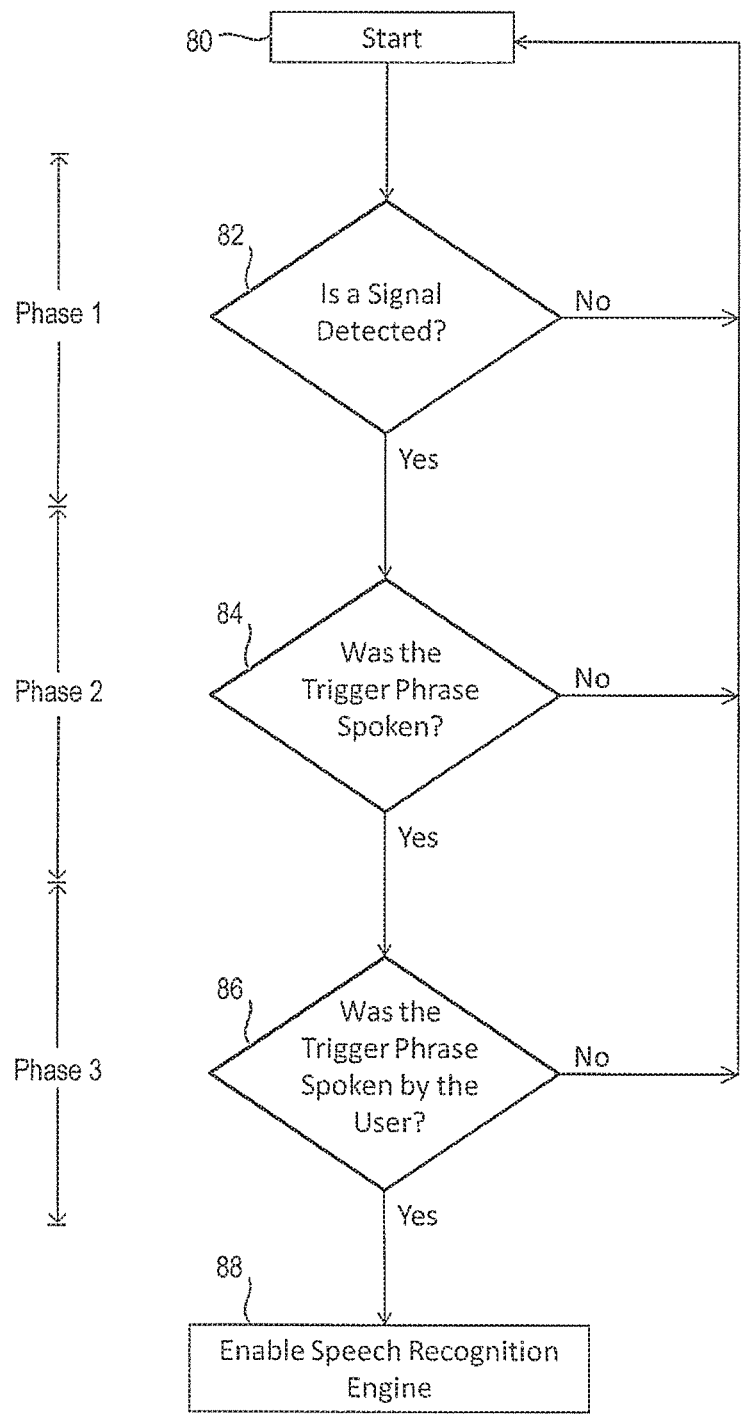
FIG. 4 is a flow diagram illustrating a general form of a process for enabling a speech recognition system.

FIG. 4 is a flow diagram illustrating the general form of this multi-phase process. The process starts at step 80, in which a signal is received from a microphone. As described with reference to FIG. 3, the microphone may be built into the handset, or may be in a separate peripheral device.

At step 82, in the phase 1 processing, it is determined whether the received electronic signal contains signal activity. Such signal activity may represent speech. If no signal activity is detected then the process continues to monitor the received electronic signal for such activity. When signal activity that may represent speech is detected in step 82, the process passes to step 84 and the phase 2 processing, in which it is determined whether the detected signal contains speech that represents a preset trigger word or phrase, i.e. a "magic word" or "magic phrase". In one example, the trigger phrase is preset by the manufacturer of the handset or other device, and thus might be the same for all such devices, or at least for all such devices sold within a particular territory, or sold to speakers of a particular language. Thus, the trigger phrase might be a generic greeting such as "hello phone". In other embodiments, the trigger phrase might be any (possibly non verbal) vocalisation.

In other examples, the handset or other device might allow the user to set their own trigger phrase, though this would need to meet certain criteria. For example it might have a maximum permitted length, and it would need to be chosen to avoid excessive false detections, for example it should not be a common conversational phrase nor be too short, e.g. a single phoneme.

If it is determined in step 84 that the signal contains speech that does not represent the preset trigger phrase, the process returns to the start to continue monitoring the received electronic signal for activity.

When it is determined in step 84 that the signal contains speech that represents the preset trigger phrase, the process passes to step 86 and the phase 3 processing, in which it is determined whether the trigger phrase was spoken by a user with whom the trigger phrase is associated, bearing in mind that a plurality of users could potentially use the device and could each potentially have their own associated trigger phrase.

Specifically, if it is determined in step 84 that the trigger phrase, which has already been detected in the signal, was being spoken by the user, then the process will pass to step 88, in which a speech recognition engine is enabled. Otherwise, the process returns to the start to continue monitoring the received electronic signal for activity.

On passing to step 88, the speech recognition engine then detects the subsequent speech of the user and, for example, converts it into commands for execution by the handset for local execution or potentially some other device connected to the cellular telephone network 29 for remote execution.

This multi-phase approach can allow the speech recognition to operate in an "always on" fashion. That is, there is no need for a user to press a button or perform any other action to activate the speech recognition. Thus, speech recognition is completely hands-free which is advantageous. Simply saying the trigger phase is enough to activate the speech recognition. Further, preferably the same instance of the trigger phase can be used in the third phase to perform speaker verification, in order to ensure that only an authorised user can give commands to or from the device in this way.

The multi-phase approach has the advantage that the "always on" operation does not use excessive amounts of power. Thus, it is only the first phase, that is the signal activity detection phase, that is always operating, and the second phase, that is the trigger phrase detection, is only activated when the first phase detects a signal that might represent speech.

The first phase can operate using very low power, and so the fact that it is always on does not lead to high continual power consumption.

The second phase operates using relatively low power, and is on for a relatively small fraction of time, and so again this does not lead to high power consumption when averaged over a time interval comprising a high fraction of inactivity.

The third phase uses a relatively high power, but is expected to be operating for only a very small fraction of time, and so again this does not lead to high average power consumption.

In an audio system of the general type shown in FIG. 3, in which there are two or more processors, the first (and also the second) phase processing may be carried out in one integrated circuit, such as the audio hub 39, while the third phase processing may be carried out in another integrated circuit, such as the applications processor 33 in the mobile telephone 1. This has the advantage that, while the handset is in a standby mode, the applications processor 33 does not even need to be woken up unless the second phase processing determines that the trigger phrase has been spoken.

Further, especially to provide more sophisticated algorithms for speech recognition (or even other applications such as real-time language translation) than may be implemented in real time with the computing and data-bank resources of the device, the actual speech recognition may advantageously not be carried out in the mobile telephone 1 at all, but might be carried out using cloud-based processing, by establishing a network connection from the mobile telephone. As this will be triggered only rarely, and when actually required, the power consumption involved with the network connection will not contribute greatly to the total average power consumption.

Thus, this progressive commitment of processing power means that the system as a whole can operate in an apparently "always on" fashion, while its average power consumption remains relatively low.

Figure 5A:
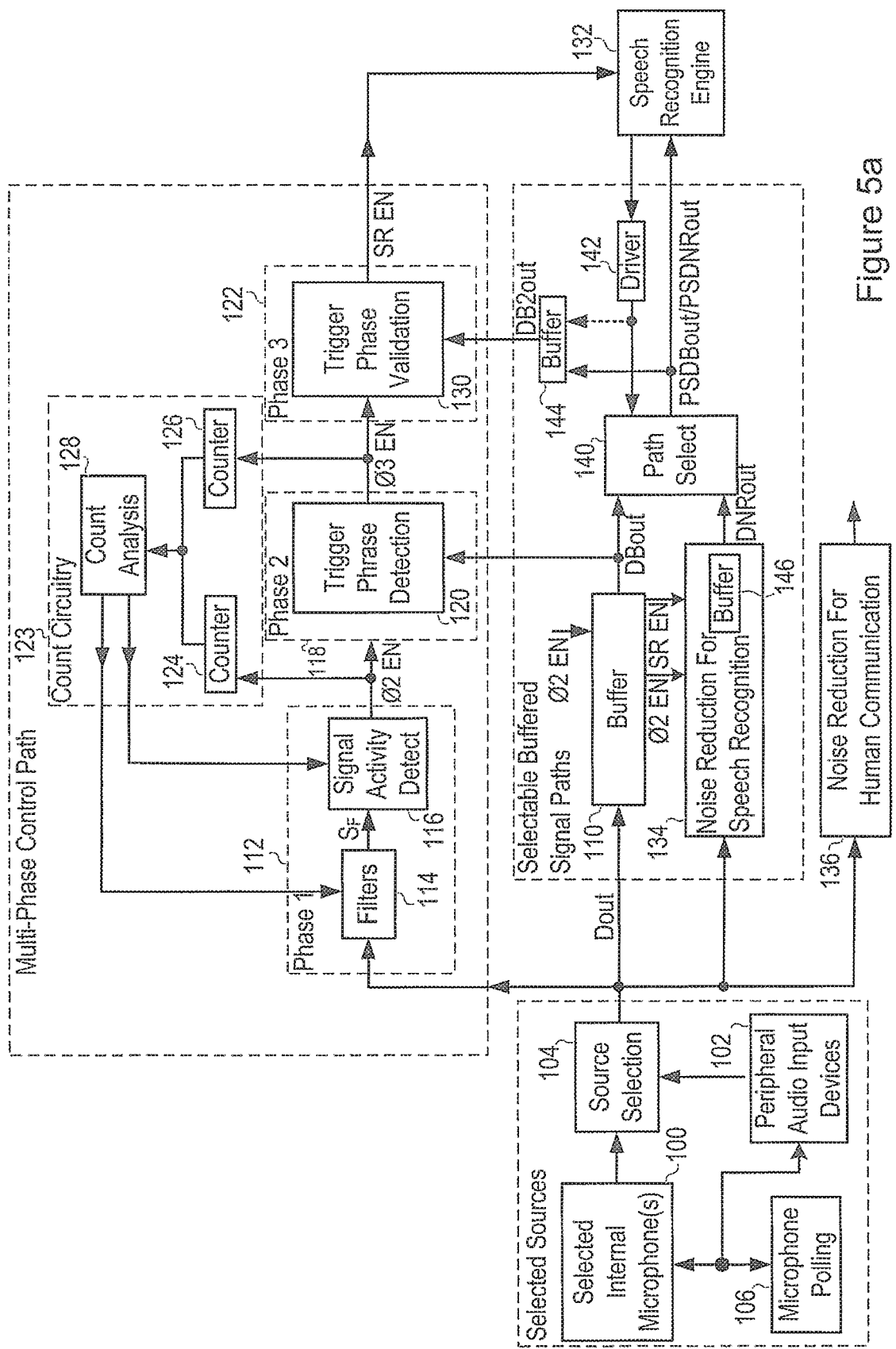
FIG. 5a illustrates the functional blocks in a speech recognition system.

FIG. 5a is a block diagram, illustrating in more detail the functionality of the speech recognition system as described herein. The required functionality may be provided in hardware or software as required, and in particular any of the functions described herein may be provided as computer-readable code possibly stored on non-transitory medium for running on any suitable computational resources for providing the required function. It will be appreciated that this functionality may be distributed amongst multiple separate integrated circuits, or even across several larger devices, as required. For example, in one embodiment based around the architecture shown in FIG. 2, the first and second phase operations might be performed in a digital signal processor within the audio hub integrated circuit, while a third phase operation might be performed in the applications processor, and the actual speech recognition might be performed in a server computer accessed over the internet. Other possibilities exist, particularly in devices with different processor architectures.

In one alternative architecture, also the third phase operation is carried out in the audio hub.

In another alternative architecture, all of the processing is performed in a single host processor, in which case the first phase (and possibly also the second phase) processing can be carried out in a power island of the processor that is always powered up, with the remainder of the processor only being powered up or enabled to perform the third phase when the second phase determines that the trigger phrase has been spoken.

FIG. 5a shows multiple possible sources for the sound system. Specifically, FIG. 5a shows a system having multiple internal microphones 100. For example, a handset might be provided with one microphone on its front surface and one microphone on its rear surface, although of course other configurations are quite possible. In a system with multiple microphones, it may be sufficient for at least the initial phases of the speech detection to use the signal from only one microphone, as described below.

In addition, the system shown in FIG. 5a has the possibility to have at least one peripheral device 102 connected thereto. For example, the peripheral device may be a headset, with a wired or wireless (for example Bluetooth™) connection. When such a headset is being worn, the microphone on the headset will usually pick up the user's speech better than a microphone on the handset, and so it will typically be preferred to use the signal detected by a microphone on the headset for the purposes of speech recognition whenever the headset is connected to the handset. Therefore, a source selection block 104 is connected to receive the signals from the internal microphone(s) 100 and the microphones on the peripheral device 102, and to select one of these signals for further processing. In this example, the source selection block 104 may then select a signal from the peripheral device 102 when it is detected that a headset is plugged into the handset, or when it is detected that the handset has a Bluetooth™ connection to a headset.

As mentioned above, at least the initial phases of a multi-phase speech recognition system can advantageously use the input from a single microphone, even when multiple microphones are available. However, it may be preferred not to rely on the input from a predetermined microphone, because one or more of the microphones on a handset may be occluded, for example if the handset is placed on a flat surface or is being carried in a bag or pocket. The system therefore includes in this example a microphone polling function 106, which detects whether one or more of the microphones is occluded, and selects the signal from a microphone that is determined not to be occluded.

For example, an algorithm running on the audio hub 39 (or the host processor 33) could periodically enable each microphone in turn (including a headset if connected), compare the magnitude of the output of each microphone across different parts of the spectrum, determine which microphone has the strongest and "flattest" signal (i.e. a spectral shape most similar to likely or desired speech signals), and select this microphone as a source for Phase 1 operation, disabling the remainder of the microphones.

The signal received from the microphone that is selected by the block 104 is passed to at least a buffer 110, which typically is able to store signals representing a period of sound, say 2-10 seconds for example: clearly the buffer can be sized so as to store the required period of time varying signal or signals. In this example, the buffer 110 stores the signal Dout generated by the selected microphone only. However, it will be appreciated that the buffer 110 may store signals generated by selected multiple microphones, or all available microphones, if source selector 104 has the capability and is controlled to select and output multiple signals concurrently.

Phase 1 processing will take a finite time to determine if the received signal Dout contains speech. While it is possible that the buffer 110 can be relatively quickly activated, i.e. woken up, when the phase 1 processing determines that the received signal Dout may contain speech so as to save the received signal Dout from that point on, it will be appreciated that some of the received signal Dout will not have been stored in the buffer 100 and will therefore be lost forever which is disadvantageous. One solution to avoid the loss of the received signal Dout, i.e. data, would be to operate, as part of the phase 1 processing, the entire buffer 110 so as to continually store signals representing the last 2-10 seconds of received signal. Thus, however long the buffer 110 is designed to store data, i.e. the received signal Dout, it is continuously stored on a first-in-first-out basis.

Operating the buffer 110 on such a continuous basis is not efficient with respect to power consumption.

In order to compromise power consumption versus loss of signal (Dout), in one example embodiment, the buffer 110 is partitioned into a plurality of portions that operate in response to the multi-phase speech recognition system. Thus, the buffer 110 can operate in a plurality of modes in response to the multi-phase speech recognition system.

In a partitioned buffer embodiment, the buffer 110 is partitioned into at least two sections, or portions, and can thus be operated in at least two independent modes, wherein the first section is smaller than the second section.

The first section of the buffer 110 should be such that it is continuously buffering, i.e. recording, at least enough of the received signal Dout so as to account for the finite time that it takes Phase 1 processing to determine that the received signal Dout does contains speech. Thus, such partial buffering, relative to complete buffering, ensures that no speech signal is lost. In reality the first section of the buffer 110 would buffer for somewhat longer, for example 200 ms longer, than the finite time that it takes Phase 1 processing to determine that the received signal Dout does contains speech. This extra buffering, 200 ms worth for example, ensures that the pass phrase required for the functionality of the speech recognition system is not lost.

The buffer 110 should preferably be of a low power nature wherein clocking is minimal and data movement between storage locations is at least minimal, if not non-existent. A suitable low power type buffer 1110 could be constructed from static random-access-memory (RAM) for example wherein pointers are used to indicate storage locations versus time events, as will be understood by those skilled in the art.

FIG. 5b illustrates one principle of how the buffer 110 may be partitioned with respect to the received signal Dout.

The received signal Dout is illustrated as comprising three constituent parts, ambient noise, a trigger phrase and one or more sentences.

It should be appreciated that the signal Dout illustrated in this FIG. 5b is an analogue-type representation of what the actual digital signal Dout would in fact be and has been illustrated in this manner for reasons of clarity and ease of explanation. It will be noted that the ambient noise part of the representative received signal Dout is illustrated as having an amplitude less than the pass phrase and sentences.

The delay in phase 1 (Ø1) processing is the time that it takes for the phase 1 processing circuitry and/or software to determine that the received signal Dout contains speech, which is illustrated in FIG. 5b as being $t_2-t_1$ (=Ø1 Processing Delay), at which point the phase 1 processing circuitry outputs a signal (Ø2 EN) indicating that the received signal Dout contains speech.

As discussed above, in order to ensure that no speech signal is lost, the buffer 110 (110a, 110b) should preferably be partitioned to at least the extent that the first section 110a is able to store the equivalent of the phase 1 processing delays, i.e. $t_2-t_1$ worth of received signal Dout.

In reality, best design practises should allow for more buffering than just that of the delay in phase 1 processing. Thus FIG. 5c illustrates that the buffer 110 is partitioned (110a, 100b) such that the first section 110a is able to store more than the equivalent of the Phase 1 processing delays worth of received signal Dout, which is illustrated in FIG. 5c as being $(t_1-t_0)$ wherein $(t_1-t_0)>(t_2-t_1)$.

As a non-limiting example, $(t_1-t_0)=(t_2-t_1)+200$ ms=Ø1 Processing Delay+200 ms.

Once the phase 1 processing determines that the received signal Dout contains speech, it outputs a signal Ø2 EN so as to enable Phase 2 processing.

As will be discussed below, this Ø2 EN signal from the phase 1 processing circuitry also controls the mode of operation of the buffer 110 such that it is able to buffer, i.e. store, more of the received signal Dout.

FIG. 5c illustrates the content of the first element 110a of the buffer 110 relative to the received signal Dout illustrated in FIG. 5b at the time $t_1$. As can be seen in FIG. 5c, the first element 110a of the buffer 110 has stored the received signal Dout over the period $t_1-t_0$ wherein $t_1$ is the time at which the pass phrase starts and the period $t_1-t_0$ is the time where there is only ambient noise. Therefore, the first element 110a has stored only ambient noise during this period $t_1-t_0$. It will be appreciated that the period $t_1-t_0$ represents the minimum buffer time that is required so as to ensure that the pass phrase required for the functionality of the speech recognition system is not lost, i.e. $(t_1-t_0)>(t_2-t_1)$. Thus, during the period $t_1-t_0$, the buffer is operating in a first mode or a phase 1 mode, i.e. a minimum buffer mode.

FIG. 5d illustrates the content of the first segment 110a of the buffer 110 relative to the received signal Dout illustrated in FIG. 5b at the time $t_2$. As can be seen in FIG. 5d, the first element 110a of the buffer 110 has stored the received signal Dout over the period $t_2-t_0'$ wherein $t_2$ is the time at which time the phase 1 processing circuitry and/or software outputs a signal (Ø2 EN) indicating that the received signal Dout contains speech. It will be appreciated that the period $t_2-t_0'$ equals that of $t_1-t_0$, i.e. the minimum buffer time. The signal Ø2 EN controls not only the phase 2 circuitry and/or software, which will be discussed in more detail below, but also the mode of operation of the buffer 110. Thus, when signal Ø2 EN changes state indicating that the received signal Dout contains speech, it controls the buffer 110 such that it will buffer, i.e. store, more of the received signal Dout. Therefore, the signal Ø2 EN controls the operational mode of the buffer 110.

FIG. 5e illustrates the content of the first segment 110a of the buffer 110 relative to the received signal Dout illustrated in FIG. 5b at the time $t_3'$. As can be seen in FIG. 5e, the entire first element 110a of the buffer 110 and part of the second element 110b of the buffer 110 have between them stored at least the whole pass phrase $t_3-t_1$. The period $t_3'-t_3$ represents a short pause (for example ~100 ms) at the end of the signal suspected of representing the trigger phrase.

From the description above and from FIGS. 5a-5e, it can be appreciated that the buffer 110 will need to be big enough to store between, for example, 2-10 seconds of the received signal Dout which will include some ambient noise, the pass phrase and a command phrase(s) in the form of at least one sentence for example.

The partitioned buffer embodiment of FIG. 5 illustrates the principle behind storing enough of the received signal Dout for trigger phrase detection. It will be appreciated by those skilled in the art that other techniques could be used to buffer the received signal Dout that do not rely upon physically partitioning the buffer (110a, 110b). For example, rather than physically portioning the buffer 110 a pair of pointers can be used that indicate the location of the start and end of enough of the received signal Dout for trigger phrase detection as it is written through, i.e. ripples through, the buffer 110.

Thus, when the phase 1 processing circuitry determines that the received signal Dout may contain speech, the buffer 110 is controlled so that it can be used to store more of the signal Dout for a relevant period of time.

Referring back to FIG. 5a, the signal Dout output from the source selection block 104 is in digital form. When the microphones 100 and the peripheral device 102 generate analog signals, an analog-digital converter may be provided in the source selection block 104, for example so that only the selected signal is converted into digital form. This has the advantage that analog-to-digital conversion is only performed on the signal(s) that are actually to be used, rather than wasting power providing converted versions of signals that will not be used.

In other embodiments, the microphones 100 and the peripheral device 102 might generate digital signals, in which case they will typically each include at least one analog-digital converter.

The signal Dout received from the microphone(s) selected by the block 104 is also passed to the first phase processing circuitry 112, and specifically to one or more filter blocks 114. The purpose of the first phase processing is to detect within the received signal Dout signals that might represent speech.

The filter blocks 114 can for example remove or attenuate the components of the signal at respective frequency bands. These frequency bands can be relatively narrow, for example to remove disturbance signals at specific frequencies, or can be relatively wide, for example to ensure that signals in frequency bands that would typically not be contained in speech are not passed through. Thus, in one example, the filter blocks 114 include a bandpass filter that passes signals in a frequency range that is typical of speech, such as 300 Hz-3 kHz.

The filtered signal $S_F$ is passed to a signal activity detection (SAD) block 116. As mentioned above, the purpose of this block 116 is to identify received microphone signals Dout that might represent speech, in order that such signals can then be examined in more detail to determine whether they contain the predetermined trigger phrase. Many signal or voice activity detection (VAD) circuits 116 already exist, for example for use in noise cancellation systems or voice wireless communication protocols, and any suitable voice/signal activity detection block/circuit 116 may be used here. However, it should be noted that some activity detection blocks/circuits 116 aim to detect the user's voice with high reliability and are thus relatively complex, and therefore require relatively high power consumption.

In this case, the result (Ø2 EN) of a positive determination by the signal activity detection block 116 enables the phase 2 processing and controls the operational mode of the buffer 110.

As such, it might be advantageous to use a relatively simple form of activity detection block 116, that has correspondingly lower power consumption, and tolerate a larger number of false detection events. For example, the activity detection block 116 might simply determine whether its received signal exceeds a threshold level. Such a determination should be made based on the overall envelope of the signal rather than a single sample being above a threshold level.

When the signal activity detection block 116 determines that the signal might contain speech, the phase 2 processing (block 118) is enabled. In particular, the phase 2 processing includes a trigger phrase detection block 120.

In this example, the signal Dout received from the selected microphone is passed through filters 114, before it is determined whether it might represent speech. The signal Dout from the selected microphone is also stored in a buffer 110. When the signal activity detection block 116 determines that a specific part of the signal Dout might represent speech, the unfiltered signal Dout generated by the selected microphone during the same time period $t_3.-t_{0'}$ is retrieved from the buffer 110 and passed to the trigger phrase detection block/circuit 120. (Here unfiltered is used to refer to a signal that has not passed through filter block 114: such a signal may have passed through some filter either included in source selector 104 or included in a common part of the path from 100/102 to 110 and 112.)

More specifically, the signal that is passed to the trigger phrase detection block 120 contains the unfiltered signal from the time period corresponding to the signal identified by the signal activity detection block, but also contains the unfiltered signal from a short period (for example 200 ms) before and a short period (for example 100 ms) after that time period. This allows the trigger phrase detection block 120 to detect the ambient noise, and to take that into account when attempting to detect the trigger phrase. This also allows for any delay $(t_2-t_1)$ in the signal detection within phase 1. The general operation of various forms of trigger phrase detection block is known to the person skilled in the art, and is not described further herein.

When the trigger phrase detection block 120 determines that the received signal contains speech representing the trigger phrase, an enable signal (Ø3 EN) is sent to the phase 3 processing (block 122). It will be noted that the trigger phrase detection block 120 in the phase 2 processing simply attempts to recognise the presence of the predetermined trigger word or phrase in the received signal Dout. It does not attempt to confirm that the trigger phrase is being spoken by the authorised user of the device.

Figure 6:
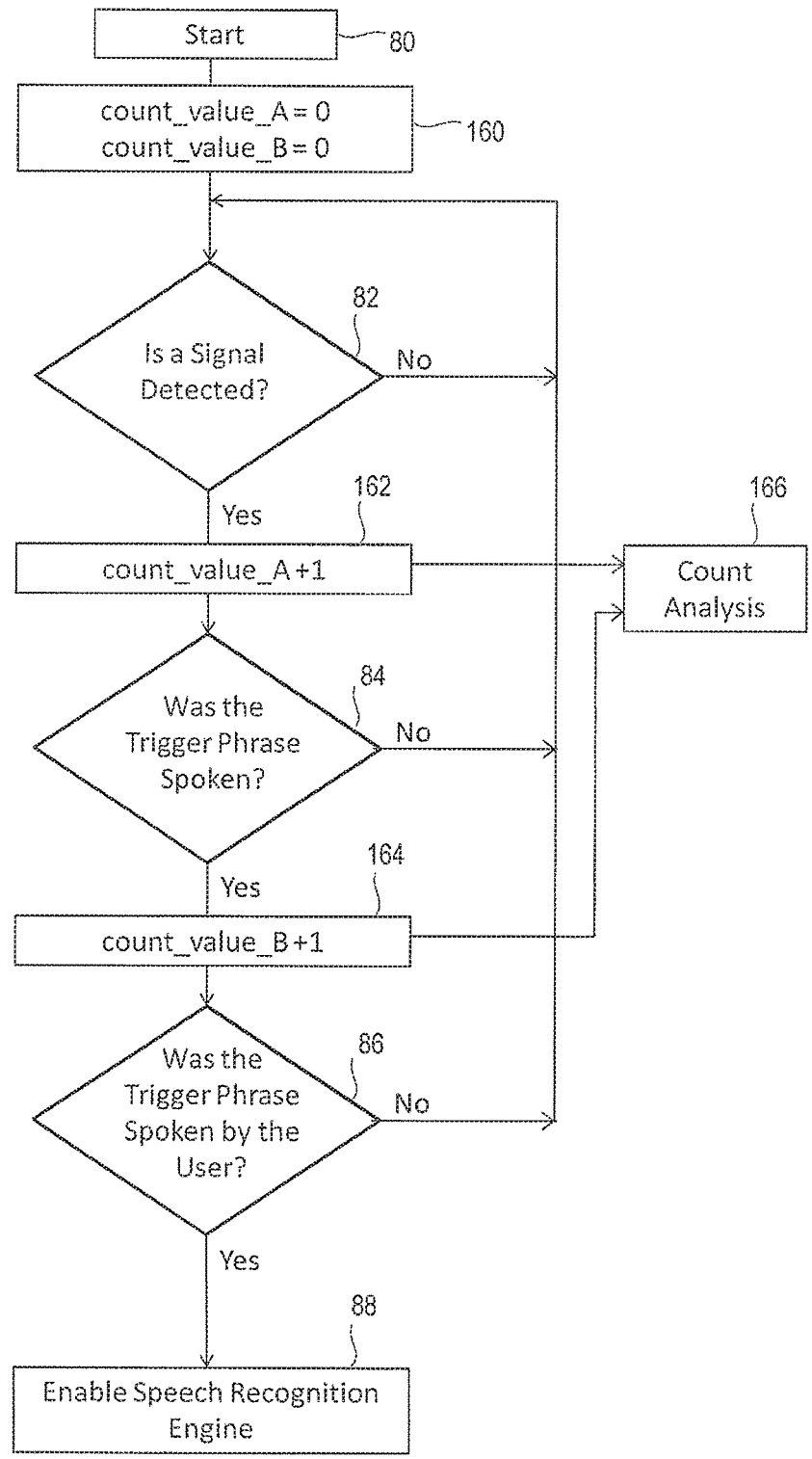
FIG. 6 is a flow diagram illustrating a modified form of the process shown in FIG. 4.

In order to minimise the overall power consumption of the speech recognition system, it is useful to adapt the process by which the phase 1 processing in block 112 causes the phase 2 processing in block 118 to be enabled, and FIG. 6 illustrates how this might be done.

FIG. 6 is a flow chart, illustrating the process of FIG. 4, with suitable modifications. Except where described here, the process of FIG. 6 is exactly the same as the process of FIG. 4. FIG. 5a shows count circuitry 123 for use in this process, comprising counters 124, 126 and a count analysis block 128. When the process starts, the two counters 124, 126 are set to zero.

When, in step 82 of the process, the phase 1 processing in block 112 causes the phase 2 processing in block 118 to be enabled, the count value of the first counter 124 is incremented by 1 in step 162. Similarly, when, in step 84 of the process, the phase 2 processing in block 118 causes the phase 3 processing in block 122 to be enabled, the count value of the second counter 126 is incremented by 1 in step 164.

In step 166, a count analysis block 128 receives the count values from the counters 124, 126. The count analysis block 128 then compares the received count values during a predetermined time period. It will be appreciated that this count analysis function may be performed either in hardware or in software. If the ratio of the count value of the second counter 126 to the count value of the first counter 124 is smaller than a predetermined ratio value, which may be set to a desired value depending on the circumstances, for example 10%, 1% or 0.1%, this suggests that the phase 1 processing is generating an excessive number of false trigger events. After the predetermined time period, the count values are reset to zero and the count values are obtained for subsequent periods.

In another example, the analysis block 128 can examine the difference between the count values of the first counter 124 and the second counter 126, rather than their ratio, and can take steps if this difference accumulated over a predetermined time period (representing the number of times that the phase 2 processing is falsely enabled) exceeds a threshold value corresponding to a predetermined number. In this case, the two counters 124, 126 can be replaced by an exclusive-OR gate connected to receive the phase 2 enable (Ø2 EN) and phase 3 enable (Ø3 EN) signals (with a suitable delay to take account of the time taken by the phase 2 processing) and a single counter.

As another example, only the first counter 124 may be provided, and the analysis block 128 can simply examine the number of times that the phase 2 processing is enabled over a predetermined time period, and can take steps if this number exceeds a threshold value corresponding to a predetermined rate.

In general, the counting to determine whether there is an excessive number of false trigger events generated by the phase 1 processing can be carried out by hardware counters or in software running on programmable computational circuitry.

When it is determined that there is an excessive number of false trigger events generated by the phase 1 processing, steps may be taken to reduce the number of false trigger events. For example, the signal activity detection block 116 might be enabling the phase 2 processing in response to a regularly occurring disturbance that has some of the same properties as speech but that is not speech. One possibility therefore is to examine the frequency spectrum of the received signal, at the times when the signal activity detection block 116 detects a signal that it considers might be speech. For example, if it is found that the received signal Dout contains a component at a specific frequency at such times, the count analysis block 128 may send a control signal to the filter block 114 to adapt the filtering, and more specifically to filter out the component at that specific frequency. Specifically, in environments where there is a constantly high level of noise close to or just inside the voice band, the bandpass filter in the filter block 114 may be adapted to exclude that noise. Similarly, if there is noise in a narrow band within the voice band (such as a 2 kHz tone from nearby equipment) a notch in an equaliser in the filter block 114 could deal with this.

Another possibility is for the analysis block 128 to send a control signal to the detection block 116, to increase the threshold signal level at which it enables (Ø2 EN) the phase 2 processing. This will simply reduce the number of occasions on which the detection block 116 will enable the phase 2 processing, while still enabling the phase 2 processing on all occasions when speech is actually present.

If the phase 1 processing is modified in response to the results of the analysis performed by the count circuitry 123, the processing can either return over time to a baseline condition, or can return to the baseline condition when the Phase 1 trigger frequency falls below a defined minimum value.

Thus by adapting the operation of the signal activity detection 116, on the basis of the relative number of false positive detections, the average power consumption may be reduced while maintaining an adequate reliability of detection of actual signal activity. More generally stated, by adapting the operation of the processing block 112 by the analysis block 128, the average power consumption may be reduced while maintaining an adequate reliability of detection of actual signal activity.

As mentioned above, the phase 3 processing is enabled by a signal (Ø3 EN) from the trigger phrase detection block 120. Specifically, in the phase 3 processing block 122, a trigger phrase validation function 130 is performed. The trigger phrase validation function 130 attempts to determine whether the trigger phrase is being spoken by the authorised user of the device.

The trigger phrase validation function 130 operates on the same section of the original signal that was used by the trigger phrase detection block 120, that is, the signal section $t_3'-t_0'$ stored in the buffer 110. (In the case where there are multiple microphones available, this will be from the microphone selected by the microphone polling function 106.) This allows successive stages of trigger phrase validation to take place transparently to the user, without the need for the user to repeat the phrase, providing security without compromising a relatively natural communication style, which is advantageous.

The trigger phrase validation function 130 therefore needs to be trained by the user, who might for example need to speak the trigger phrase multiple times and under multiple conditions as part of the initialization of the system. Then, when the phase 3 processing is enabled, the trigger phrase validation function 130 can compare the speech data with the stored data obtained during this initialization, in order to judge whether the trigger phrase has been spoken by the user. Techniques for performing this function are known to the person skilled in the art, and so they are not described in further detail here, as they are not relevant for an understanding of the present invention.

When it is determined by the trigger phrase validation function 130 that the trigger phrase was spoken by an authorised user, an enable signal (SR EN) is sent to the speech recognition engine (SRE) 132 which might be provided in a specialist processor, and might, as mentioned previously, be provided in a separate device altogether. The purpose of the speech recognition function 132 is to identify commands spoken by the user after speaking the trigger phrase. These commands can then be acted upon for control purposes, for example to control an aspect of the operation of the mobile telephone 1 or other device. By way of example, the command may be an instruction to place a phone call to another person specified in the command.

In one example, the system is configured so that certain functions can be performed by any person, without waiting for the phrase validation function 130 to complete its analysis of the current speech sample or to make its decision. As noted above, the normal operation is that the second phase processing will recognise that a specified trigger phrase has been spoken, and the third phrase processing will recognise whether it has been spoken by the specified user. Only if the third phrase processing recognises that the trigger phrase was spoken by the specified user, the subsequent speech will be sent to the speech recognition engine for interpretation and processing.

However, if the subsequent speech contains a predetermined phrase (which may for example be a phrase from a list of "emergency response" type phrases, such as "Call 999", "Call ambulance", or the like), then this is recognised, and the appropriate action is taken, without first determining whether it was an authorised user that spoke the trigger phrase. In order to achieve this, this recognition step may take place in the trigger phrase detection block 120. Alternatively, whenever the trigger phrase is detected in the phase 2 processing, the subsequent speech may always be sent to the speech recognition engine 132 (in parallel with trigger phrase validation function 130) to determine whether it contains one of the specified emergency call phrases.

In order to be able to perform speech recognition with a high degree of accuracy, it may be advantageous to perform noise reduction on the speech signal before performing the speech recognition.

Thus, the signal Dout output by the source selection block 104 may be passed to a noise reduction block 134 so that it generates a noise-reduced output DNRout. In another example, the signals from multiple microphones may be supplied to the noise reduction block 134, so that it generates a single noise-reduced output DNRout from the multiple inputs, e.g. by adaptive beam-forming. In the noise reduction block 134, the noise reduction is specifically optimised for automatic speech recognition. The output signal DNRout of this noise reduction block 134 is ultimately passed to a speech recognition function, as described in more detail below. In order to save power, it may be advantageous for the noise reduction block 134 to be switched on only once the trigger phrase detection block 120 has determined that the trigger phrase has been spoken i.e. the signal Ø2 EN enables the operation of the noise reduction block 134.

Similarly, if the system is being used in a device with multiple microphones, the source selector 104 may be controlled so that the signal from only one selected microphone is passed to the buffer 110 during the phase 1 and phase 2 processing, but the signals from the multiple microphones are passed to the noise reduction block 134 only if the trigger phrase is detected (Ø3 EN), or only if the trigger phrase is validated (SR EN) in the phase 3 processing.

At the same time, the signal Dout output by the source selection block 104 may be passed to a second noise reduction block 136, in which the noise reduction is specifically optimised for human communication or the characteristics of the network voice communication channel to be used. In the case where the device is a mobile telephone, the output of this second noise reduction block 136 is ultimately transmitted over the mobile communications link. The operation of a suitable second noise reduction block 136 is known to the person skilled in the art, and will not be described further herein.

It will therefore be noted that the functions performed by the first noise reduction block 134 and second noise reduction block 136 are different. In one example, the functions performed by the second noise reduction block 136 are a subset of the functions performed by the first noise reduction block 134. More specifically, noise reduction that is performed for human communication tends to introduce distortion and other artefacts which have an adverse impact on speech recognition. Therefore, a low distortion form of processing is used in the second noise reduction block 136 for speech recognition.

The output DNRout of the first noise reduction block 134, which is optimised for speech recognition, and the output DBout of the buffer 110, that is the buffered unfiltered digital input speech signal Dout, are both capable of being passed to a path selection block 140, which is controlled by a selection driver 142. The signal (DBout, DNRout) selected by the path selection block 140 may then be passed to the trigger phrase validation block 130 and the speech recognition engine 132.

In one example, as discussed above, the phase 2 processing 118 and the associated functions, including the buffer 110 and the path select block 140, are provided in one integrated circuit such as an audio hub, i.e. audio codec, while the phase 3 processing is provided in another integrated circuit such as an applications processor of a mobile phone.

In the case where phase 3 processing is provided in another integrated circuit, the audio hub may be connected to the applications processor by means of a bus that can provide data in relatively high-speed bursts. One bus that can provide data in relatively high-speed bursts is a SPI bus (Serial Peripheral Interface bus), a so-called "bursty" type bus. To take advantage of the "bursty" nature of the SPI bus the path selection block 140 may be connected to the trigger phrase validation bock 130 by means of a buffer 144. The relatively high-speed transfer and subsequent storage, i.e. buffering, of the data in the buffer 144 advantageously allows the trigger phrase validation block 130 enough time to prepare to receive the input data after being activated (Ø3 EN) by the trigger phrase detection block 120. The first noise reduction block 134 also includes a buffer 146 to manage the practicalities of moving data across the bursty (SPI) bus. The "bursty" type bus inherently has a bandwidth such that it may be unavailable for some periods, and so a certain amount of buffering helps avoid data loss.

In one example, the signal stored in the buffer 110 is passed to the trigger phrase validation block 130 via the path selection block 140 and buffer 144. If the trigger phrase validation block 130 determines (SR EN) that the trigger phrase was spoken by the authorised user, it is the output DNRout of the noise reduction block 134 that is then passed to the speech recognition engine 132.

However, for optimum performance, the timing of the selection of the signals DBout and DNRout should be coordinated. Thus, in another example, the signal stored in the buffer 110 is passed to the trigger phrase validation block 130. If the trigger phrase validation block 130 determines that the trigger phrase was spoken by the authorised user, the output DBout of the buffer 110 is passed to the speech recognition engine 132. The speech recognition engine 132 is then able to determine a suitable time to switch to receiving the output signal DNRout from the noise reduction block 134, and the driver 142 controls the path selection block 140 to start directing the signal DNRout output from the noise reduction block 134 to the speech recognition engine 132 at that time. The buffer 110 provides enough history, i.e., stores enough data, to be able to manage the time-alignment of data output from the buffer 110 and data output from the noise reduction block 134, which has a certain latency, when changing the source of data.

For example, the speech recognition engine 132 may be designed so as to be able to determine a time when there is a break in the user's speech, for example representing the end of a spoken sentence. This is a common feature of a speech recognition engine to allow whole sentences of spoken speech to be sent to a remote speech recognition system together.

The speech recognition engine 132 can then recognise a break in the speech, and can determine that this is a suitable time to switch to receiving the signal DNRout from the noise reduction block 134.

In order to ensure that a steady stream of data is received by the speech recognition engine 132, suitable buffering must take place.

FIG. 7 is a time history, showing the form of various signals throughout the speech recognition system at different times. In this purely schematic representation, a high level digital signal represents a signal containing speech, and a low level digital signal represents a signal that does not contain speech.

FIG. 7a illustrates a representation of analogue ambient noise and speech signals that are external to the device in which the speech recognition system resides and which are to be captured by the systems one or more microphones and thereafter used for speech recognition.

FIG. 7a more specifically illustrates a representation of analogue ambient noise and speech that comprises: a first period of analogue ambient noise up to $t_1$, followed by; a period $t_1$–$t_3$, of speech, which for the purposes of this explanation represents a trigger word or phrase, followed by; a second period $t_3$–$t_4$ of analogue ambient noise, followed by; a period $t_4$–$t_5$, of speech, which for the purposes of this explanation represents a command phrase in the form of a first sentence (Sentence 1), followed by; a third second period $t_5$–$t_6$ of analogue ambient noise, followed by; a period $t_6$–$t_7$, of speech, which for the purposes of this explanation represents another command phrase in the form of a second sentence (Sentence 2); and a third period $t_7$–$t_8$ of analogue ambient noise.

FIG. 7b illustrates a digital representation of the analogue ambient noise and speech of FIG. 7a.

It should be noted that for clarity of explanation it is assumed that there is no delay in the conversion of the analogue ambient noise and speech signal to a digital ambient noise and speech signal (Dout). Thus, the various periods described above between $t_0$–$t_8$ in respect of FIG. 7a are also applicable to FIG. 7b.

FIG. 7c illustrates the digital signal Ø2 EN, as described above in respect of FIG. 5b, that as part of the phase 1 processing indicates that the digital ambient noise and speech signal (Dout) may contain speech.

The signal Ø2 EN indicating the potential presence of speech is used to control both the phase 2 processing (block 118) and the buffer 110.

In this example, the signal Dout received from the selectable sources is, as part of the phase 1 processing, passed through filters 114 before it is determined whether it might represent speech. The signal Dout is also stored in a buffer 110. When the signal activity detection block 116 determines that a specific part of the signal Dout might represent speech, the unfiltered signal Dout generated by the selected microphone(s) during the period $t_3$-$t_0$, (see FIG. 5b) is retrieved from the buffer 110 and passed to the trigger phrase detection block/circuit 120 as part of phase 2 processing. Here the term "unfiltered" is used to refer to a signal that has not passed through filter block 114: such a signal may have passed through some filter either included in source selector 104 or included in a common part of the path from 100/102 to 110 and 112.

More specifically, the signal DBout, as illustrated in FIG. 7d, that is passed to the trigger phrase detection block 120 contains the unfiltered signal from the time period corresponding to the signal identified by the signal activity detection block, but also contains the unfiltered signal from a short period (for example 200 ms) before and a short period (for example 100 ms) after that time period. This allows the trigger phrase detector 120 to detect the ambient noise, and to take that into account when attempting to detect the trigger phrase. This also allows for any delay ($t_2$-$t_1$) in the signal detection within phase 1. The general operation of various forms of trigger phrase detection block is known to the person skilled in the art, and is not described further herein.

Thus the phase 2 processor 118 receives a signal DBout output from the buffer 110 and tries to determine if the initial relatively short burst of signal Dout contains a trigger phrase. If as a result of phase 2 processing a potential trigger phrase is detected, the phase 2 processing block 118 outputs a phase 3 enable signal (Ø3 EN), as illustrated in FIG. 7e, indicating the potential presence of a trigger phrase. Due to the finite time that it takes to carry out phase 2 processing, the phase 3 enable signal (Ø3 EN) is output a short period after the trigger phrase has ended, at time $t_4'$.

In response to the phase 3 enable signal (Ø3 EN), phase 3 processing 122 is activated. The phase 3 enable signal (Ø3 EN) also controls the buffer 110 and the path select block 140. Thus the signal (Dout) stored in the buffer 110 is output (PSDout) for phase 3 processing via the path select block 140, as illustrated in FIG. 7f.

In reality, phase 3 processing will require a finite time to become operative. Therefore, the output (PSDout) from the buffer 110 via the path select 140 is passed to a further buffer 144 to impart a further delay, as illustrated in FIG. 7g. The phase 3 processing 122 determines, i.e. validates, whether the trigger phrase was indeed spoken by an authorised user after it has received the whole of the initial short burst of speech, via buffer 144, at time $t_4''$ and outputs a control signal SR EN which controls the speech recognition engine (SRE) 132. FIG. 7h illustrates the SR EN control signal.

As described above, the speech recognition engine 132 can operate most successfully if it receives the original signal Dout from the selectable source after it has passed through the noise reduction block 134. The noise reduction block 134 therefore receives the signal Dout from the source selection block 104 at the same time as it is received by the buffer 110, as illustrated in FIG. 7i. The noise reduction block 134 comprises a buffer 146 for buffering the input signal Dout to the noise reduction block 134. The buffer 146 operates in the same manner as buffer 110 and allows the original signal Dout to be stored for subsequent processing by the noise reduction block 134.

The noise reduction processing only starts when phase 3 processing validates, via control signal SR EN, that the trigger phrase was spoken by an authorised user. It is not practical for the speech recognition engine 132 to immediately start processing the output signal PSDNRout of the noise reduction circuitry, via the path select 140, as any transient effects during the switching would corrupt the speech recognition. Also, it takes a time for the noise reduction algorithm in the noise reduction block 134 to "warm-up", or converge to a final noise reduction solution, and using the output of the noise reduction algorithm during this initial period may cause distortion. Further, the latency of the noise reduction algorithm is not entirely predictable or constant, and so it is not necessarily possible to time-align the data from the buffer 110 and from the noise reduction block 134 reliably, without causing duplicated or lost samples when the path select switch is made.

Therefore it is the output PSDBout of the buffer 110, via the path select 140, that is initially passed to the speech recognition engine 132. It is a conventional requirement of such circuitry that it should be able to recognise gaps in the speech such as those illustrated between $t_3$-$t_4$ and $t_5$-$t_6$ etc. Therefore, in this example, when the speech recognition engine 132 recognises a gap in the speech, the opportunity is taken to switch the path selection block 140 so that it is the output of the noise reduction block 134 that is passed to the speech recognition engine 132. Making this switch during a gap in the speech mitigates or avoids the problems discussed above.

Thus, in this illustrated example, the speech recognition engine 132 recognises a gap in the speech, between the trigger phrase and the first sentence. At this time, the path selection block 140 is switched so that it is the output of the noise reduction block 134 that is passed to the speech recognition engine 132. Since the delay imparted by the noise reduction circuitry in the noise reduction block 134 is typically less than the delay imparted by the buffer 110, the noise reduction block 134 also buffers the noise-reduced signal, which imparts a further delay (illustrated in FIGS. 7j and 7k) so that the output of the noise reduction block 134 can be substantially time-aligned with the output of the buffer 110. Any slight misalignment is irrelevant because it will fall within a time when the signal does not contain speech.

The output of the noise reduction block 134 can therefore start to be supplied to the speech recognition engine 132 at time $t_5$.

FIGS. 8(a)-(d) depict time histories illustrating the operation of the speech recognition system in different scenarios. In each of these, an initial period 200 of ambient noise is followed by a voice 202 speaking the words "Hi phone, please navigate to the nearest cafe", where "Hi phone" is the trigger phrase, and "please navigate to the nearest cafe" is a voice command to be interpreted by the speech recognition engine and used as an input to a function such as a satellite navigation application. A further period 204 of ambient noise follows the spoken words.

Further, in each case illustrated in FIGS. 8(a)-(d), the period 202 containing the speech starts at the time $t_{11}$, and the phase 1 processing recognises the presence of the speech at the time $t_{12}$. When the presence of the speech is recognised by the signal activity detection function, the phase 2 processing is started. The effect of the buffer is that the signal containing the speech is stored, and that the signal during a preceding period of least about 200 ms starting at the time $t_{13}$ is also stored.

As mentioned above, the speech during the period 202 starts with the trigger phrase "Hi phone", and the phase 2 processing block recognises at the time $t_{14}$ that the trigger phrase has been spoken. At this point, the phase 2 processing block sends a signal to activate the phase 3 processing block but, due to the time taken to initialise the phase 3 processing block, it is unable to start reading the stored signal from the buffer 110 until the time $t_{15}$. Of course, at the time $t_{15}$ the phase 3 processing block starts to read the buffered data from the time $t_{13}$.

Figure 8A:
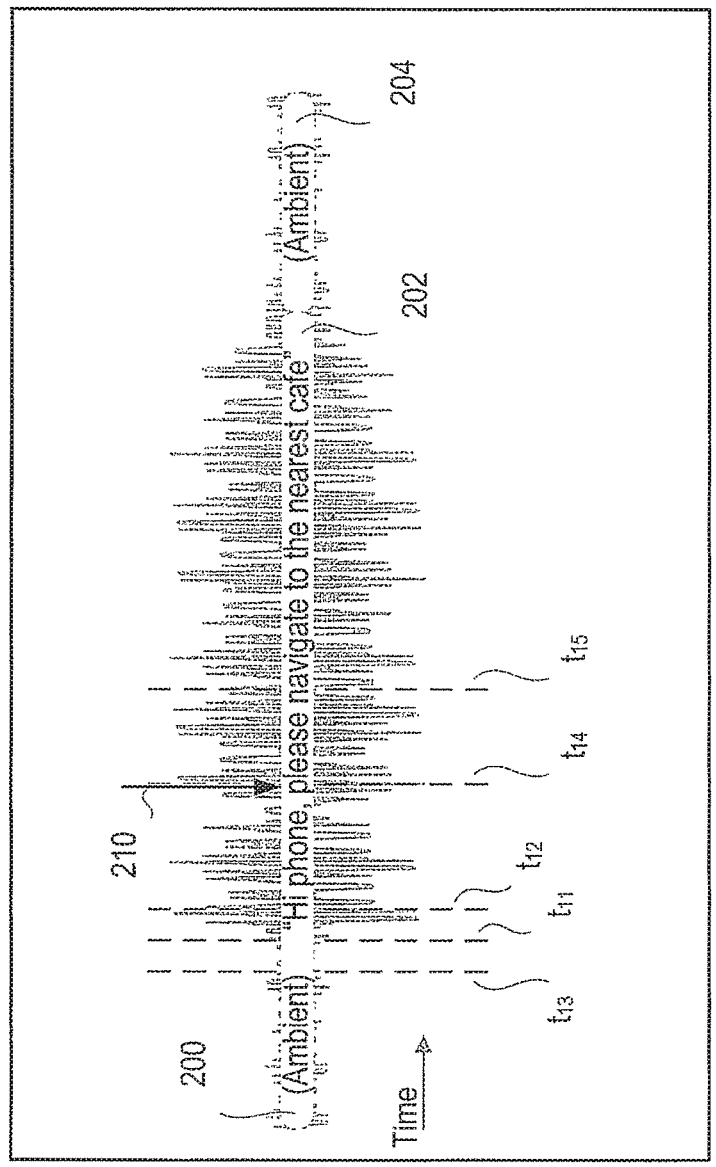

FIG. 8(a) illustrates an example in which, as shown by the arrow 210, the decision to start the noise reduction block 134 is taken (in the audio hub 39 in an implementation such as that shown in FIG. 3) immediately in response to the positive determination by the phase 2 processing block at the time $t_{14}$. That is, the noise reduction is started as soon as the trigger phrase is detected. FIG. 8(a) also illustrates a situation in which there is a seamless transition between the raw data output from the buffer 110 and the data output from the noise reduction block 134.

Figure 8B:
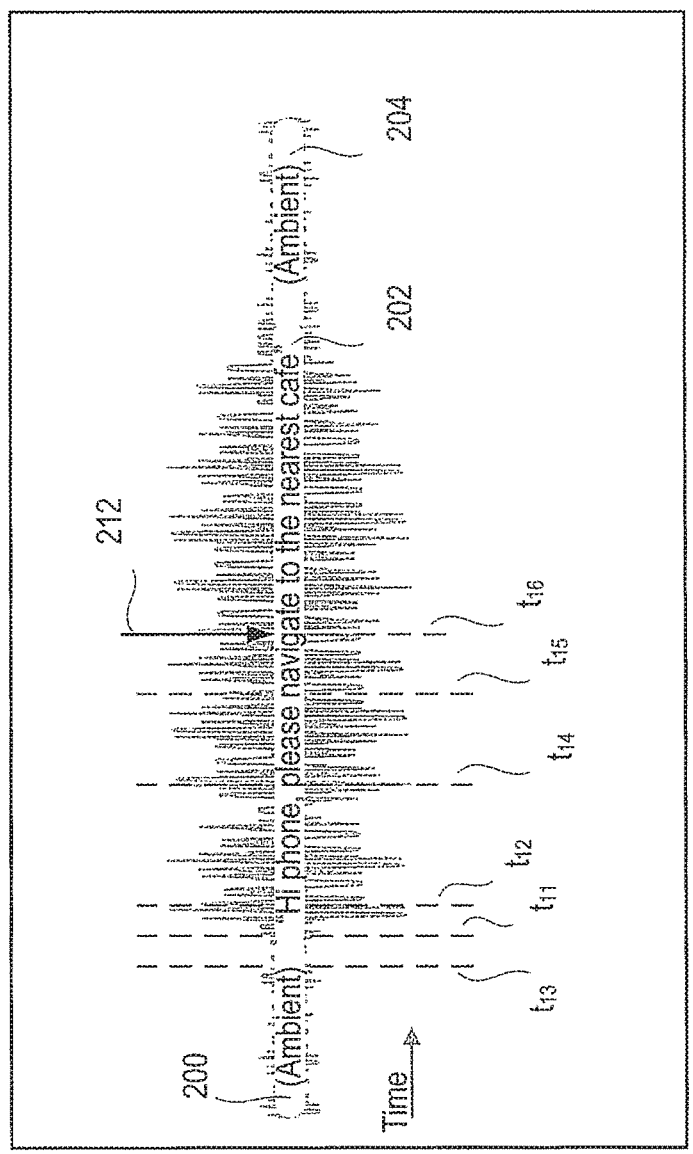

FIG. 8(b) illustrates an example in which, as shown by the arrow 212, the decision to start the noise reduction block 134 is taken in the applications processor 33 in an implementation such as that shown in FIG. 3, after the initialisation of that processor following a positive determination by the phase 2 processing block. That is, the noise reduction is started at a time $t_{16}$. FIG. 8(b) also illustrates a situation in which there is a seamless transition between the raw data output from the buffer 110 and the data output from the noise reduction block 134.

Figure 8C:
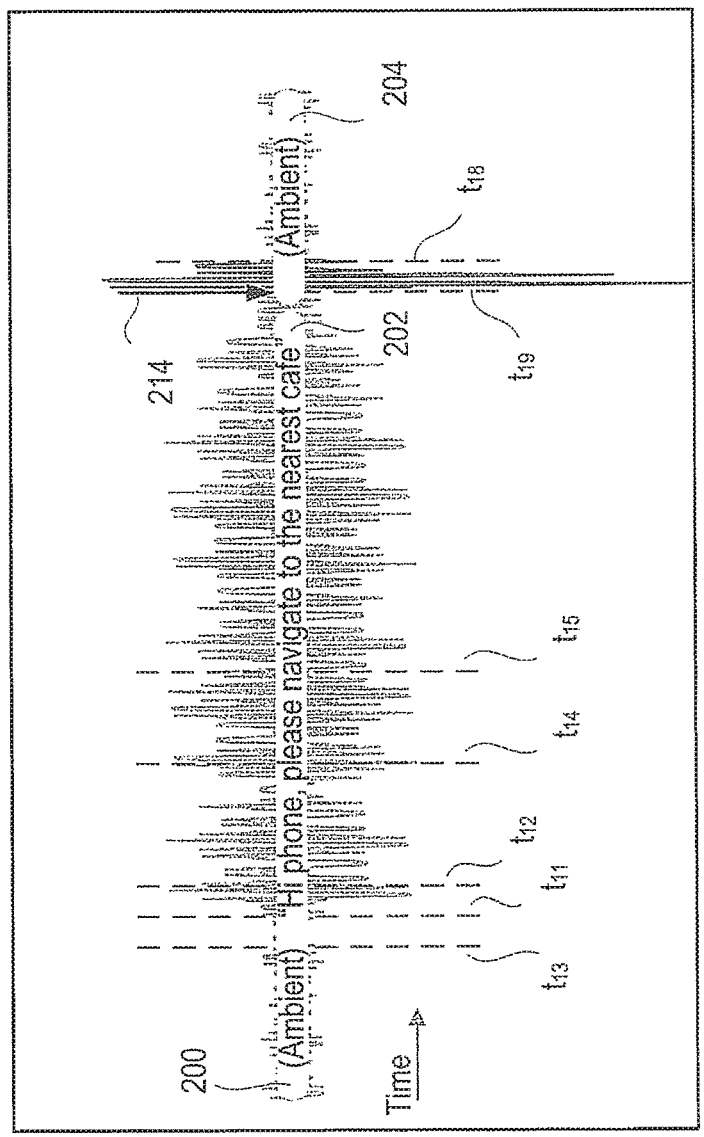

FIG. 8(c) illustrates an example in which, as shown by the arrow 214, the decision to start the noise reduction block 134 is taken in the applications processor 33 in an implementation such as that shown in FIG. 3, after the initialisation of that processor following a positive determination by the phase 2 processing block. FIG. 8(c) illustrates a situation in which the transition between the raw data output from the buffer 110 and the data output from the noise reduction block 134 is not seamless, and may lead to a dead time. That is, the data in the time period immediately after the noise reduction block 134 is started may be lost. Therefore, in the example shown in FIG. 8(c), the start of the noise reduction block 134 is delayed until the end of the speech 202, and so the data that may be lost during the period from $t_{17}$–$t_{18}$ contains only the ambient noise.

Figure 8D:
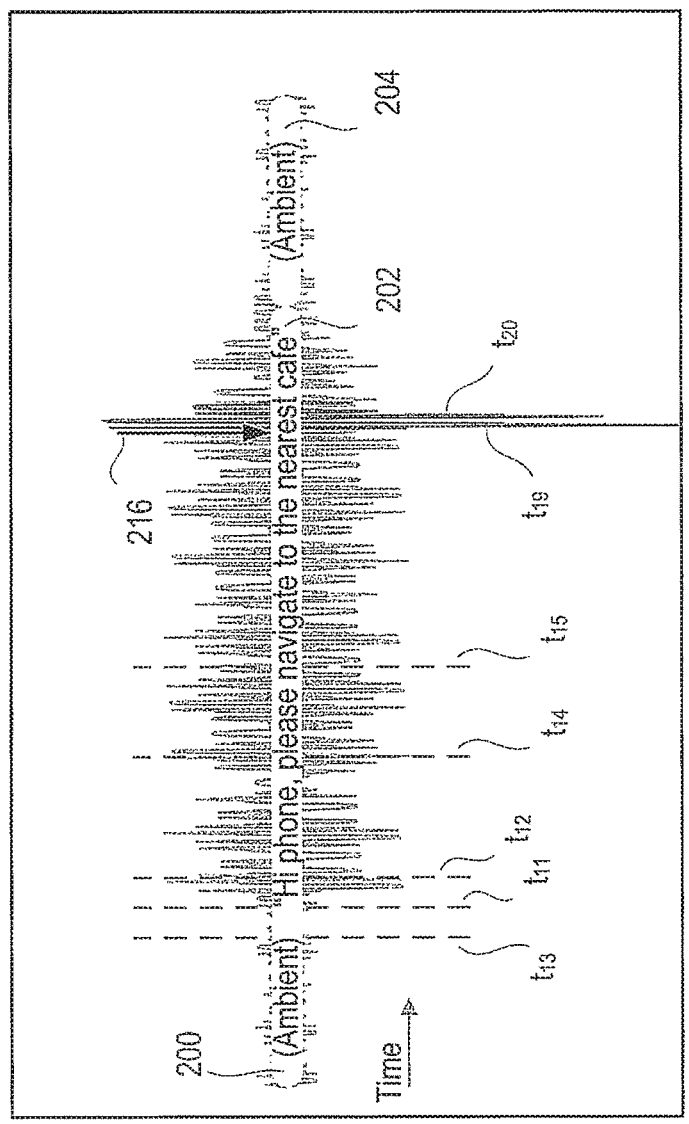

FIG. 8(d) illustrates an example in which, as shown by the arrow 216, the decision to start the noise reduction block 134 is taken in the applications processor 33 in an implementation such as that shown in FIG. 3, after the initialisation of that processor following a positive determination by the phase 2 processing block. FIG. 8(d) also illustrates a situation in which the transition between the raw data output from the buffer 110 and the data output from the noise reduction block 134 is not seamless, and may lead to a dead time. That is, the data in the time period immediately after the noise reduction block 134 is started may be lost. In the example shown in FIG. 8(d), the noise reduction block 134 is started at an arbitrary time after the applications processor 33 has been initialised, and so data that may be lost during the potential dead time from $t_{19}$–$t_{20}$.

It was mentioned above that, while the microphones 100 and the peripheral device 102 generate analog signals, an analog-to-digital converter may be provided in the source selection block 104, so that only the selected signal is converted into digital form. This has the advantage that analog-to-digital conversion is only performed on the signal(s) that are actually to be used, rather than wasting power providing converted versions of signals that will not be used.

As mentioned above, to provide sufficient accuracy in the digitisation of the speech signal for reliable speech recognition or user recognition, a high performance ADC is required. The ADC will typically also comprise low noise analog circuitry consuming a significant amount of power. In one example described here, the high-performance analog-to-digital converter is configured to also be able to operate in a second mode, being a relatively low power monitor mode, e.g. when lower performance is acceptable.

FIG. 9 is a schematic diagram illustrating relevant parts of the system of FIG. 5. Specifically, FIG. 9 shows an analog-to-digital converter (ADC) 250, which may, as described above, be provided in the source selection block 104, or may be connected to receive the signal that is selected and output by the source selection block 104. The digital signal generated by the analog-to-digital converter 250 is supplied to a voice activity detection (VAD) block, more generally described as a signal activity detection (SAD), block 252. When the VAD/SAD block 252 detects the presence of a signal of interest in the signal generated by the analog-to-digital converter 250 in its monitor mode, the VAD/SAD block 252 sends a control signal to the analog-to-digital converter 250 to switch its operation to the second mode from the normal, first, mode. Thus the ADC has a first mode or high performance mode or relatively high power mode or processing mode and a second mode or low performance mode or relatively low power mode or monitor mode.

FIG. 9 also shows a digital signal processor (DSP) 254, which may for example contain relevant parts of the signal processing function, such as the trigger phrase detection block 120 and subsequent processing blocks in the example shown in FIG. 5. Specifically, the signal output by the analog-to-digital converter 250 is supplied to DSP 254 (for example after passing through the buffer 110 in the example of FIG. 9). Some or all of the DSP may be enabled or disabled by the control signal "Enable" shown.

In some embodiments these control signals to the ADC and DSP may be equivalent (i.e. the same except for maybe polarity or a relative delay to compensate for any signal delay in the path coupling the ADC to the DSP). Thus when the analog-to-digital converter 250 is in its low power monitor mode, the DSP 254 may be disabled. And thus, at the same time as the VAD/SAD block 252 sends a control signal to the analog-to-digital converter 250 to switch it to its high performance mode, it also sends an enable signal to the DSP 254. Then, the DSP 254 is able to receive and process the signals generated by the analog-to-digital converter 250 operating in its second mode.

In other embodiments, for example where the DSP may implement both the trigger phrase detection function and the speech recognition function, and the trigger phrase detection may be adequately accurate using the lower-resolution ADC output whereas the speech recognition function requires the higher quality ADC operation mode, then the VAD/SAD may alter the ADC and DSP enabling control signals at different times.

FIG. 10 is a block schematic diagram illustrating in general terms one possible form of the analog-to-digital converter 250. More specifically, FIG. 10 shows the analog-to-digital converter 250 receiving an input analog signal $S_{in}$, and generating an output digital signal $D_{out}$. The analog-to-digital converter 250 also receives a MODE signal from a Detect block such as the VAD/SAD 252 in FIG. 9.

The input signal $S_{in}$ is applied to a first input of a subtractor 270, and to a first input of a multiplexer 272. The output signal $D_{out}$ is fed back through a digital-to-analog converter (DAC) 274, with the resulting analog signal $S_{fb}$ being passed to a second input of the subtractor 270. The output $S_{diff}$ of the subtractor 270 is passed to a filter block 276 having a filter transfer function G(f), with the filtered signal $S_{filt}$ being applied to a second input of the multiplexer 272. The selected input signal $S_{in}/S_{filt}$ that is output from the multiplexer 272 represents the input signal $Q_{in}$ passed to a quantiser (Q) 278, from which the output digital signal $D_{out}$ is generated.

The input MODE signal is used to generate enable (EN) signals for the digital-to-analog converter 274, and for the filter block 276 and is used to select which input signal $S_{in}/S_{filt}$ of the multiplexer 272 is selected as the input signal $Q_{in}$ of the quantiser (Q) 278.

Thus, in normal operation (that is, the "first mode" mentioned above), the digital-to-analog converter 274 and the filter block 276 are enabled, and the second input signal $S_{filt}$ of the multiplexer 272 is passed to its output, i.e. used as the input signal $Q_{in}$ to the quantiser (Q) 278 The DAC 274, the subtractor 270, and the filter block 276 then provide a negative feedback path for the output signal $D_{out}$ around the quantiser (Q) 278, and therefore help to suppress audio-band quantisation noise introduced by the finite resolution of the quantiser (Q) 278 (and other error components such as any non-linearity).

However, in monitor mode (that is, the "second mode" mentioned above), the MODE signal operates such that the first input signal $S_{in}$ of the multiplexer 272 is passed to its output, and so the input signal $S_{in}$ is applied directly to the quantiser Q (that is, $Q_{in}=S_{in}$), and the quantiser output $D_{out}$ is used as the digital output. (Although it will be recognised that there may be other filters and/or amplifiers in the $S_{in}$ signal path, or other processing blocks such as decimation filters after the quantiser. Also, as shown by the dotted path 279, the input signal $S_{in}$ may be passed to the multiplexer 272 through the filter block 276) The analog-to-digital converter 250 thus now operates in an open-loop mode, i.e. second mode, rather than a closed-loop mode, i.e. first mode.

The monitor mode is a lower-performance mode, because there is no longer the feedback loop to suppress the quantisation noise or any quantiser non-linearity. In order to reduce the power consumption in this mode, at least the filter block 276 or the digital-to-converter 274, but preferably both, are also disabled in response to the MODE signal.

As discussed below, "disabling" the filter block 276 or the digital-to-analog converter 274 may involve opening a series switch in the signal path, or placing the respective output node into a high-impedance state, or providing a constant output, zero or otherwise. Preferably, disabling includes removing bias current from stages of active circuitry such as amplifiers, with the advantage of reducing the power consumption.

Disabling the filter block 276 may involve gating applied clocks, removing a source of power supply, or reducing the applied power supply to reduce leakage currents. Typically, the digital-to-analog converter and amplifiers in the analog filter 276 will consume in the order of 80% of the power of the analog-to-digital converter, and so the power consumption can be significantly reduced in the monitor mode, i.e. second mode.

Components of the subtractor 270 may be shared with or physically located in the filter 276. The multiplexer 272 may be implemented at least partially by placing either the output of the filter 276 or some buffer stage in the alternate path (i.e. the path to the first input of the multiplexer 272) into a high impedance mode. The alternate path may re-use elements of the filter block 276 to provide an internal by-pass path. FIG. 10 shows the alternate path starting before the subtractor 270, but it may alternatively start after the subtractor, as the nodes are equivalent if there is no feedback signal.

The filter block 276 itself may be alterable to alter its coefficients etc. so as to provide the equivalent of the alternate path. Effectively, an alternate feedforward path similar to that shown in FIG. 10 would then be provided by signal routing physically inside the filter rather than outside.

FIG. 10 shows a DAC 274, producing on its output node an explicit signal whose voltage, current or charge corresponds to the digital feedback signal $S_{fb}$. However, the DAC function may instead be implicit in the switching timing of some switched capacitor network with capacitors that also receive the input signal $S_{in}$, so that the output charge of the DAC function is immediately mixed with the input signal charge so no separately measurable voltage, current or even charge corresponds directly to the digital feedback signal, but the signal processing effect is equivalent to using a discrete DAC.

In some examples, the quantiser (Q) 278 may also be controllable by the MODE signal so that, when the analog-to-digital converter 250 is operating in its second mode, i.e. its monitor mode, the quantiser (Q) 278 operates in a lower-power mode, for example running at a lower sample rate mode or lower-resolution mode that is adequate for monitoring the input signal $S_{in}$. When the analog-to-digital converter 250 switches into the normal, closed-loop, mode, i.e. the first mode, the quantiser (Q) 278 operates in a higher-power mode that provides a higher-accuracy digital output as required for accurate speech or user voice recognition.

The MODE signal may be supplied by a local voice detector 252 as described with reference to FIG. 9, with downstream circuitry (such as hardware or a software DSP) not being activated when the analog-to-digital converter 250 is in monitor mode, in order to minimise the overall power consumption. However, it would also be possible for at least some of the downstream hardware or software to be active at all times, and to generate the MODE signal from $D_{out}$ or some downstream signal.

FIG. 11 is a schematic circuit diagram illustrating in more detail an analog-to-digital converter 290 of the same general form as the analog-to-digital converter 250 shown in FIG. 10. Elements of the circuit shown in FIG. 11 that are the same as elements of the circuit shown in FIG. 10 are indicated by the same reference numerals, and are not described further herein.

The input signal $S_{in}$ is applied to a resistor 292 having a resistance value $R_{in}$ and its other end attached to an op amp virtual earth node to generate a corresponding current $S_{in}/R_{in}$, and the digital-to-analog converter 274 takes the form of a current digital-to-analog converter (IDAC), so that the current $S_{fb}$ drawn through it is proportional to the digital signal $D_{out}$ fed back from the output of the circuit.

This current $S_{fb}$ is subtracted from the current that corresponds to the input signal, and it is the resulting net current that is supplied as an input to the filter block, which in this example takes the form of an inverting integrator, with an amplifier 294 having its inverting input connected to the junction of the resistor 292 and the IDAC 274, and with a capacitor ($C_{int}$) 296 connected between its output and the inverting input terminal.

The multiplexer takes the form of a switch 298, possibly in the form of a CMOS transmission gate, that is controlled by the MODE signal.

The quantiser takes the form of a voltage controlled oscillator 300 that receives the quantiser input signal $Q_{in}$ and is connected to a counter 302.

FIG. 12 is a schematic circuit diagram that shows in more detail a possible form of the current digital-to-analog converter (IDAC) 274 in the circuit of FIG. 11.

Specifically, FIG. 12 shows a reference current $I_{ref}$ being supplied to the IDAC 274, and being mirrored through three current mirror transistors 310, 312, 314, which act as current sources to generate respective different currents according to ratios of the sizes of the transistors. More specifically, the current mirror circuit 310 generates a current that is twice the current generated by the current mirror circuit 312, and the current mirror circuit 312 in turn generates a current that is twice the current generated by the current mirror circuit 314. The IDAC 274 operates on a bias voltage $V_{B1}$, which may be generated inside the IDAC or outside.

The IDAC 274 also receives the digital output signal $D_{out}$ of the analog-to-digital converter 290, which in this case is a 3-bit digital signal, having bit values α[0], α[1], α[2], with α[0] being the most significant bit. These three bit values are used to turn on or off the current sources in the current mirror circuits 310, 312, 314 respectively, and so the output current $S_{fb}$ is proportional to the digital output signal $D_{out}$.

In other embodiments at least some of the current mirror slave current sources may be equal values and the fed back digital signal may be subjected to modification en route to implement known techniques such as Dynamic Element Matching (DEM) for improving the average linearity of the fed back signal despite random manufacturing mismatches between the current sources.

FIG. 13 is a schematic circuit diagram that shows in more detail the form of the voltage controlled oscillator (VCO) 300 in the circuit of FIG. 11.

Specifically, the voltage controlled oscillator in the example shown in FIG. 13 takes the form of a three-stage ring oscillator, with three inverters 320, 322, 324, each comprising a pair of PMOS and NMOS transistors. Each inverter delays the input signal, and the feedback from the output causes the output signal $VCO_{out}$ to oscillate. As is well known, the delay introduced by each inverter depends on the voltage $V_C$, and so the frequency of the output signal $VCO_{out}$ depends on the voltage $V_C$. In this case, a current source 326 generates a current $I_B$ to bias a PMOS source follower with gate connected to $Q_{in}$ and so the input signal $Q_{in}$, together with the almost constant PMOS gate-source bias voltage defined by $I_B$ determines the voltage $V_C$, and hence determines the frequency of $VCO_{out}$.

The MODE signal is used to reduce the current in the current source 326 when the analog-to-digital converter 290 is in monitor mode, and this in turn reduces the magnitude of the gate-source bias voltage and hence reduces the voltage $V_C$ and hence the quiescent frequency of the VCO. This frequency reduction will also reduce the dynamic power consumption of the counter 326.

As with all of the analog circuitry described here, a differential implementation may be used, for example to help sensitivity to cross-talk from elsewhere, say on the same integrated circuit. In this case, a pair of complementary differential input signals may be applied to the respective inputs of a pair of respective VCOs and counters, with the quantiser output being the difference in the counts of the two counters.

FIG. 14 is a schematic circuit diagram that shows in more detail the form of an alternative voltage controlled oscillator (VCO) 330 in the circuit of FIG. 11, which in this case is based on a current controlled oscillator.

Again, the voltage controlled oscillator in the example shown in FIG. 14 takes the form of a three-stage ring oscillator, with three inverters 332, 334, 336, each comprising a pair of PMOS and NMOS transistors. A current $I_{CP}$ is applied to the three inverters, and the feedback from the output to the first inverter 332 causes the output signal $ICO_{out}$ to oscillate.

The current $I_{CP}$ is generated by an input circuit that receives the input voltage $Q_{in}$ and applies it to the non-inverting input of an amplifier 338. The inverting input of the amplifier 338 is connected to ground through a digitally programmable variable resistor 342, having a resistance value $R_S$, and the output of the amplifier 338 is connected to the gate of a transistor 340, whose source is connected to ground through a variable resistor 342 and is also connected to provide feedback path to the inverting input of amplifier 338. This feedback causes the op amp to drive the gate of transistor 340 so as to impose a voltage equal to $Q_{in}$ across the resistor 342. This generates a current $I_{SP}$, equal to $Q_{in}/R_s$, through resistor 342 and through the transistor 340 to a current mirror circuit 344, 346 which generates a corresponding current $I_{CP}$, which may be equal to $I_{SP}$ or may be an appropriately scaled version thereof.

The current $I_{CP}$ this increases with increase in $Q_{in}$, and the frequency of oscillation of the ICO will increase if the current $I_{CP}$ is increased, so the frequency of oscillation observed at $ICO_{out}$ depends on the input voltage $Q_{in}$.

Again, the MODE signal is used to reduce the currents, by altering the value of resistor 342, when the analog-to-digital converter 290 is in monitor mode, and hence reduce the quiescent frequency of the VCO 330.

As described with reference to FIG. 13, a differential implementation is also possible.

FIG. 15 is a time history, illustrating the operation of the quantiser in the analog-to-digital converter 290 of FIG. 11, and similar circuits.

Specifically, FIG. 15 shows the output signal $VCO_{out}$ of the voltage controlled oscillator 300 (or 330 in the implementation shown in FIG. 13) generated in response to the input signal $Q_{in}$. A clock signal $f_{ref}$ is used by the counter 302. The frequency of the clock signal $f_{ref}$ may be constant, or it may be reduced in response to the MODE signal when the analog-to-digital converter 290 is in monitor mode, in order to reduce power consumption. The counter 302 is reset to zero at the start of each period of clock signal $f_{ref}$ and then counts the number of pulses in the signal $VCO_{out}$, during that period of $f_{ref}$, and generates the output signal $D_{out}$ to represent the number of such pulses.

Using a VCO as a quantiser has the advantage, that for a given resolution the low frequency quantisation noise is reduced, in a similar way to a more conventional first-order delta-sigma ADC but with small size and simplicity and loose device matching requirements.

During each cycle of the clock signal $f_{ref}$, the output signal $D_{out}$ has only limited accuracy (for example it varies between 4 and 5 in the extremely coarse resolution example illustrated in FIG. 15). However, over a long period, since the VCO is not reset, the average number of counts (i.e. the total number of cycles of the continuously oscillating VCO over the long period, divided by the relevant number of $f_{ref}$ clock cycles) corresponds to the average input signal to within a resolution of one count over an arbitrarily long time, i.e. an arbitrarily large total count, and so there is in principle no d.c. quantisation-induced error; all the error is at higher frequencies.

The behaviour may also be understood from a different perspective. If the VCO is already part way through a cycle at the start of a $f_{ref}$ period, this affects how far through another cycle it is at the next $f_{ref}$ edge. Thus each $f_{ref}$ cycle takes a measure of the "phase" of its output waveform and adds any more phase that is built up by the end of the cycle. Thus, it first-order integrates the quantisation error, analogously to the error-integrating function of the analog integrator in a more conventional first-order delta-sigma ADC, so the quantisation noise spectrum is similar to a first-order delta-sigma ADC.

Thus not only is the quantiser small and simple, it also gives much less audio band quantisation noise than might be expected simply from the resolution of the counter 302.

FIG. 16 is a schematic circuit diagram illustrating in more detail an analog-to-digital converter 360 of the same general form as the analog-to-digital converter 250 shown in FIG. 10. Elements of the circuit shown in FIG. 16 that are the same as elements of the circuit shown in FIG. 10 are indicated by the same reference numerals, and are not described further herein.

In the converter of FIG. 10, in normal operation the feedback signal from the DAC is fed back to a single subtractor at the input. In more complex architectures, e.g. to implement higher-order converters to obtain more noise shaping, it is known to provide signal feedback in normal operation via subtractor nodes at intermediate points within filter G(f) or even at its output, as illustrated in FIG. 16. Also in some cases the input signal may be filtered and fed forward to subtraction nodes within or after the filter, bypassing the input subtractor. Embodiments of the invention may comprise such filter architectures in the forward path, appropriately disabled in low-power mode(s) of operation.

FIG. 16 also shows a filter 362, having a filter transfer function H(f) in the feedback path, that is, filtering the output signal $D_{out}$ before passing it to the digital-to-analog converter 274. This again gives more flexibility to optimise the signal and noise transfer functions.

FIG. 17 is a schematic circuit diagram illustrating in more detail an analog-to-digital converter 390 of the same general form as the analog-to-digital converter 290 shown in FIG. 11, but implemented using switched capacitor techniques. Elements of the circuit shown in FIG. 17 that are the same as elements of the circuit shown in FIG. 11 are indicated by the same reference numerals, and are not described further herein.

The input signal $S_{in}$ is coupled to the integrator input via an input capacitor $C_{in}$ 402 in series with switches at each end thereof, the switches being controlled by a two-phase clock at frequency $f_{ref}$ generated by clock generation block CKGEN, 400.

In a first phase of the clock $C_{in}$ is connected by these switches between $S_{in}$ and ground and stores a charge $S_{in} \cdot C_{in}$; in a second phase $C_{in}$ is connected between ground and the op amp virtual earth and the op amp adds this charge to any charge already stored on the integrating capacitor $C_{int}$ 296.

Similarly an array of capacitors $C_{fb}$ is coupled to the virtual earth, to provide a feedback signal component. In the first clock phase, each capacitor in the array is connected to ground at both ends, to discharge each capacitor. In the second phase, each capacitor of the array is connected at one end to the virtual earth and the other end may be connected to either one or the other of two reference voltages $V_{RP}$ or $V_{RN}$ in each clock cycle, according to the polarity of a respective bit in a control word derived from the quantiser output signal. This connection may be by additional series switches or by gating the clocks applied to switch elements coupling each capacitor to $V_{RP}$ or $V_{RN}$.

Thus, in response to a control word representing a value α, in each second clock phase a fraction α say of $C_{fb}$ is charged to $V_{RP}$ and the remaining fraction 1−α of $C_{fb}$ is charged to $V_{RN}$, so the total charge on the array is (α. $V_{RP}$+(1−α)·$V_{RN}$)·$C_{fb}$. This charge represents the digital quantiser output. (For simplicity, the array is represented in FIG. 17 by only two capacitors, 396, 398, of variable size and connectable to respective reference voltages).

Since the capacitor was discharged in the first phase, this charge corresponding to the control signal a has to be supplied by transfer from the integrating capacitor.

The control signals are themselves derived from $Q_{out}$ by a decoder block 392 (possibly including Dynamic Element Matching (DEM) functionality as mentioned above), Thus each clock period, a charge corresponding to the quantiser output $Q_{out}$ is subtracted from that accumulated on the integrating capacitor.

In the circuit of FIG. 17, a charge representing $S_{in}$ is held on $C_{in}$ and a charge representing $D_{out}$ is held on $C_{fb}$ before transfer onto the integrating capacitor. In some cases, some or all of the feedback capacitor array may be merged with an input capacitor array, and so the subtraction of the feedback signal from the input signal may be implicit, and it may not be possible to identify a fed back analog signal as such, separate from the input signal. However the operation of the circuit is still equivalent.

FIG. 18 is a schematic circuit diagram of such an arrangement, in which an analog-to-digital converter 420 of the same general form as the analog-to-digital converter 390 shown in FIG. 17. Elements of the circuit shown in FIG. 18 that are the same as elements of the circuit shown in FIG. 17 are indicated by the same reference numerals, and are not described further herein.

In the analog-to-digital converter 420, in the first clock phase the input signal $S_{in}$ is applied to the capacitors 396, 398 of the feedback capacitor array through respective switches 422, 424, generating a charge of $S_{in} \cdot C_{fb}$. In the second phase, the reference voltages $V_{RP}$ or $V_{RN}$ are connected to respective fractions of $C_{fb}$, to alter the charge on $C_{fb}$ by an amount representing $D_{out}$, but there is never a phase where the array holds a charge purely representing $D_{out}$ without $S_{in}$.

An additional capacitor 426 ($C_{inx}$) may be necessary to increase the conversion gain (in bits per volt), i.e. to alter the relative weighting at the input between $S_{in}$ and $D_{out}$. Conversely the additional capacitor 426 may not be there, but a secondary array of feedback caps may be provided to decrease the conversion gain.

FIG. 19 is a schematic circuit diagram illustrating in more detail an analog-to-digital converter 440 of the same general form as the analog-to-digital converter 250 shown in FIG. 10. Elements of the circuit shown in FIG. 19 that are the same as elements of the circuit shown in FIG. 10 are indicated by the same reference numerals, and are not described further herein.

In the analog-to-digital converter 440 of FIG. 19, the output digital signal $D_{out}$ is passed through an integrator 442 and a second digital-to-analog converter 444 to generate a feedback signal $S_{dcfb}$ that is passed to a further subtractor xxx, in the path from $S_{in}$. When active, this second feedback path provides high-gain feedback at low (sub-audio) frequencies, thus zeroing out any d.c. offset of the circuitry or apparent in the signal Sin. But the path does not pass appreciable audio-frequency signal, so the response of the ADC to audio frequency input signals is unaffected.

This second "d.c. servo" feedback loop may consume relatively little power, so may be active in both modes of the ADC. However it may only be operational during an initialisation stage, and then disabled. The purpose of this disabling is primarily to avoid any modulation of the subtracted signal by output signal components, not to save power. Also the signal fed back in the second feedback path is for a different purpose (to remove d.c.) than that fed back in the first feedback path (to linearise the system by signal-band negative feedback).

FIG. 20 is a schematic diagram illustrating a use of an analog-to-digital converter as described above, on a semiconductor die 469 co-packaged with a microphone sensor 462 in a single packaged device 460.

More specifically, FIG. 20 shows a microphone 462 receiving a bias voltage Vand generating a signal that is passed to a pre-amplifier 464 before being passed to the analog-to-digital converter 466. All circuitry except the actual microphone capacitive sensor 462 may be integrated together on a single semiconductor die 469 as shown, although in some embodiments the capacitive sensor may also be integrated on the same die as all or at least some of the circuitry shown.

A clock signal CK is used to clock the analog-to-digital converter 466 and also an output digital interface block (FMT) 468.

A detect block 470 detects the output of the analog-to-digital converter 466, and controls the mode of operation of the analog-to-digital converter 466 based on the detection result. The same control signal may also be used to control the pre-amplifier 464 and the output interface block 468. For example, the detection result may be used to reduce the bias of the pre-amplifier 464 in low power mode, at the expense of distortion or thermal noise performance.

The output interface block 468 may merely retime the output ADC data, or may include noise shaping bit-width reduction circuitry to convert a multi-bit ADC output to a convenient single-bit format, or may reformat the delta-sigma output signal $D_{out}$ into another format, such as a pulse length modulation (PLM) format, or (via decimation) into a standard multi-bit format, for example I2S at 24-bit and fs=48 kHz.

Reformatting may allow some control-type bits to be transmitted along with the data, for example to flag the output of the detect block 470 to downstream circuitry. For example the Detect block 470 may serve as a signal detect block and control a downstream trigger phrase detection block. Downstream circuitry such as count analysis circuitry may also communicate back to the device 460, to alter parameters of the detection, either by a separate pin or by modulating the length or phase of pulses or phase of edges of the clock CK.

FIG. 21 is a schematic circuit diagram of another analog-to-digital converter 480 of the same general form as the analog-to-digital converter 250 shown in FIG. 10. Elements of the circuit shown in FIG. 21 that are the same as elements of the circuit shown in FIG. 10 are indicated by the same reference numerals, and are not described further herein.

The circuit shown in FIG. 21 is suitable for use in a situation in which a plurality of input signals are available, in this case two, and it is necessary to select which one, if either, should be converted to a high quality digital output. For example, in a communications device with multiple microphones, when one or more may be occluded from time to time, it is useful to poll the microphones periodically to decide which microphone should be used.

Thus, the circuit of FIG. 21 receives a plurality of input analog signals $S_{inA}$, $S_{inB}$, and generates a corresponding plurality of respective output digital signals $D_{outA}$, $D_{outB}$. One of these input signals may be selected for high quality conversion using the feedback path, the other input signal(s) may still be converted, but using the respective quantiser, open-loop, only providing a lower quality output but with small additional power consumption and not requiring a digital filter or feedback DAC for each channel.

The input analog signals $S_{inA}$, $S_{inB}$ are applied to a multiplexer 482, whose output may be coupled, possibly via a programmable gain amplifier as shown, to a first input of a subtractor 270, and they are also applied to the respective first inputs of multiplexers 486, 488. The output digital signals $D_{outA}$, $D_{outB}$ are passed to a multiplexer 484, whose output signal is fed back through a digital-to-analog converter (DAC) 274, with the resulting analog signal $S_{fb}$ being passed to a second input of the subtractor 270. The output $S_{diff}$ of the subtractor 270 is passed to a filter block 276 having a filter transfer function G(f), with the filtered signal $S_{filt}$ being applied to the respective second inputs of the multiplexers 486, 488. The output of the multiplexer 486 is passed to a first quantiser (Q) 490 to form the first output digital signal $D_{outA}$, while the output of the multiplexer 488 is passed to a second quantiser (Q) 492 to form the second output digital signal $D_{outB}$.

Control signals M1, M2 and SEL control the multiplexers and hence the mode of operation of the circuitry. A further control signal, MODE is used to generate enable (EN) signals for the digital-to-analog converter 274, and for the filter block 276. FIG. 21 illustrates the logic levels for MODE, M1, M2 and SEL required for three modes of operation: (a) low-power conversion of both $S_{inA}$ and $S_{inB}$, (b) high-quality conversion of $S_{inA}$ and low-power conversion of $S_{inB}$, and (c) low-power conversion of $S_{inA}$ and high-quality conversion of $S_{inB}$. Since there is only one feedback DAC and one filter G(f) it is not possible to simultaneously convert both input signals with high-quality (though the circuit could be readily extended by adding further DACs, filters and multiplexers in a similar fashion to allow more channels to be selected for concurrent high-quality conversion).

In this example, a detect block 252 is present. This block receives the output digital signals $D_{outA}$, $D_{outB}$, and uses these to select which of the input analog signals should be used to generate an output by generating the appropriate control signal levels as above. Though in other embodiments these control signals might be supplied from elsewhere, for example from downstream detectors of various sorts.

The input select signal (SEL) is used to determine which of the input analog signals $S_{inA}$, $S_{inB}$ should be passed by the multiplexer 482 to the subtractor 270, and is also used to determine which of the output digital signals $D_{outA}$, $D_{outB}$ are passed by the multiplexer 484 to the digital-to-analog converter (DAC) 274. At the same time, a control signal M1 is used to determine which input of the multiplexer 486 is passed to the first quantiser 490 and a control signal M2 is used to determine which input of the multiplexer 488 is passed to the second quantiser 492.

Thus, in modes (b) and (c) above, the digital-to-analog converter 274 and the filter block 276 are enabled, and the second input of one of the multiplexers 486, 488 is passed to its respective output. The DAC 274, the subtractor 270, and the filter block 276 then provide a negative feedback path for the respective output signal around the respective quantiser.

However, in mode (a) above, the M1 and M2 signals are set such that the first input of each of the multiplexers 486, 488 is passed to each respective output, and so each respective input signal is applied directly to the respective quantiser Q. The analog-to-digital converter 480 thus now operates in an open-loop mode for both input channels rather than a closed-loop mode.

Since both channels are operating open-loop, there is no need for the DAC or filter, or for the optional programmable gain amplifier, so these blocks may be disabled by setting MODE to 0. Although not shown, this may also disable the subtractor 270 and multiplexers 482 and 484.

In some applications, there may be a need to program the gain applied to the input signal prior to conversion in high-quality mode, but no need to adapt this gain in low-power mode, for example a fixed gain may be adequate for initial signal detection but a programmable gain useful in optimising dynamic range for more complex downstream processing. Thus it is advantageous to place the amplifier between the input and subtractor 270 and not in the path from input to quantiser multiplexer. Also since only one channel may be converted at high quality, there is only need for one programmable gain amplifier. Thus it is advantageous to position such a gain stage after the multiplexer 482.

There is thus disclosed an analog-to-digital converter that can provide a high quality output, and can also be operated in a low power mode.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. The terms "trigger phrase" and "trigger word" are interchangeable throughout the description. Any reference signs in the claims shall not be construed so as to limit their scope.

The invention claimed is:

1. A method of processing a signal representing speech, the method comprising:
   receiving signals from a plurality of microphones;
   selecting a signal from one of said plurality of microphones;
   continuously buffering the selected signal, for a first period of time longer than an expected duration of a predetermined pass phrase;
   while continuously buffering the selected signal, monitoring the selected signal to detect the presence of speech; and
   on detecting the presence of speech in the received selected signal:
      continuously buffering the selected signal for a second period of time,
   wherein the second period of time is longer than the first period of time; and
      attempting to detect the predetermined pass phrase in the content of the buffer.

2. The method according to claim 1, comprising buffering the selected signal for a period of time in the range of 2-10 seconds.

3. The method according to claim 1, comprising continuously buffering the selected signal on a first-in first-out basis.

4. The method according to claim 1, comprising:
   receiving analog signals from said plurality of microphones;
   converting the selected signal into digital form; and
   continuously buffering the selected signal in digital form.

5. The method according to claim 1, when performed in a mobile phone, the method comprising:
   when the signals from the plurality of microphones comprise a signal from a headset having a connection to the mobile phone, selecting said signal from the headset.

6. The method according to claim 1, comprising:
   determining whether at least one of said plurality of microphones is occluded;
   wherein the selected signal is from one of said plurality of microphones that has been determined not to be occluded.

7. The method according to claim 1, further comprising:
   on detecting the predetermined pass phrase in the content of the buffer, performing speaker recognition to determine whether the predetermined pass phrase was spoken by an enrolled speaker.

8. A signal processing device, comprising:
   an input for receiving signals from a plurality of microphones;
   a selector for selecting a signal from one of said plurality of microphones;
   a buffer for continuously buffering the selected signal, for a period of time longer than an expected duration of a predetermined pass phrase;
   a signal activity detector, for monitoring the selected signal during the continuous buffering of the selected signal to detect the presence of speech; and
   a pass phrase detector, for attempting to detect the predetermined pass phrase in the content of the buffer following detection of the presence of speech in the selected signal;
   wherein the buffer is configured for:
      continuously buffering the selected signal, for a first period of time; and
      in response to detecting the presence of speech in the selected signal, continuously buffering the selected signal for a second period of time, wherein the second period of time is longer than the first period of time.

9. The device according to claim 8, wherein the buffer is capable of storing the selected signal for a period of time in the range of 2-10 seconds.

10. The device according to claim 8, wherein the buffer is configured for continuously storing the selected signal on a first-in first-out basis.

11. The device according to claim 8, further comprising:
   a speaker recognition block, for performing speaker recognition to determine whether the predetermined pass phrase was spoken by an enrolled speaker, following detection of the predetermined pass phrase in the content of the buffer, to determine whether the predetermined pass phrase was spoken by an enrolled speaker.

12. A mobile phone, comprising a plurality of microphones, and a signal processing device, wherein the signal processing device comprises:
   an input for receiving signals from the plurality of microphones;
   a selector for selecting a signal from one of the plurality of microphones;
   a buffer for continuously buffering the selected signal, for a period of time longer than an expected duration of a predetermined pass phrase;
   a signal activity detector, for monitoring the selected signal to detect the presence of speech during the continuous buffering of the selected signal; and
   a pass phrase detector, for attempting to detect the predetermined pass phrase in the content of the buffer following detection of the presence of speech in the selected signal;

wherein the buffer is configured for:
  continuously buffering the selected signal, for a first period of time; and
  in response to detecting the presence of speech in the selected signal, continuously buffering the selected signal for a second period of time, wherein the second period of time is longer than the first period of time.

13. The mobile phone according to claim 12,
wherein the plurality of microphones are configured for generating analog signals;
comprising an analog-digital converter for converting the selected signal into digital form;
wherein the buffer is configured for continuously buffering the selected signal in digital form.

14. The mobile phone according to claim 12, having a connection for a headset, wherein the selector is configured for, when a headset is connected thereto, selecting said signal from the headset.

15. The mobile phone according to claim 12, configured for:
  determining whether at least one of said plurality of microphones is occluded;
  wherein the selected signals from one of said plurality of microphones that has been determined not to be occluded.

* * * * *

UNITED STATES PATENT AND TRADEMARK OFFICE
CERTIFICATE OF CORRECTION

| | |
|---|---|
| PATENT NO. | : 11,335,338 B2 |
| APPLICATION NO. | : 16/585167 |
| DATED | : May 17, 2022 |
| INVENTOR(S) | : Lesso et al. |

It is certified that error appears in the above-identified patent and that said Letters Patent is hereby corrected as shown below:

In the Claims

1. In Column 29, Lines 45-46, in Claim 1, delete "received selected" and insert -- selected --, therefor.

Signed and Sealed this
Thirtieth Day of May, 2023

Katherine Kelly Vidal
*Director of the United States Patent and Trademark Office*